United States Patent [19]

Sergeant et al.

[11] 4,007,448
[45] Feb. 8, 1977

[54] DRIVE FOR CONNECTION TO MULTIPLE CONTROLLERS IN A DIGITAL DATA SECONDARY STORAGE FACILITY

[75] Inventors: Winston O. Sergeant, Harvard; John V. Levy, Maynard; Demetrios Lignos, Chelmsford; Kent M. Griggs, Newtonville, all of Mass.

[73] Assignee: Digital Equipment Corporation, Maynard, Mass.

[22] Filed: Aug. 15, 1974

[21] Appl. No.: 497,700

[52] U.S. Cl. .......................................... 340/172.5
[51] Int. Cl.² ........................................ G06F 3/06
[58] Field of Search ..................... 340/172.5; 445/1

[56] References Cited
UNITED STATES PATENTS

| | | | |
|---|---|---|---|
| 3,061,192 | 10/1962 | Terzian | 445/1 |
| 3,214,739 | 10/1965 | Gountanis et al. | 445/1 |
| 3,623,014 | 11/1971 | Doetz et al. | 340/172.5 |
| 3,693,161 | 9/1972 | Price et al. | 340/172.5 |
| 3,840,859 | 10/1974 | Vigil et al. | 445/1 |

Primary Examiner—Harvey E. Springborn
Attorney, Agent, or Firm—Cesari and McKenna

[57] ABSTRACT

A secondary storage facility for a data processing system including a drive unit which connects to a pair of controllers. Switching circuits in the drive unit couple a data transfer section and a common control section for the transfer section to one or the other controller in response to selection signals. Other control sections connect to respective ones of the controllers to receive signals and a selection circuit responds by transmitting the selection signals. If one controller tries to transfer information to or from the common control section while the selection signal designates the other controller, the transfer does not occur. If the attempted transfer is to the common control section or from predetermined locations in the common control section, the attempt is retained so the drive can signal back through the other controller when the selection signal can change. If the attempted transfer is from the common control section, then the drive transmits back to the controller a unique code.

16 Claims, 18 Drawing Figures

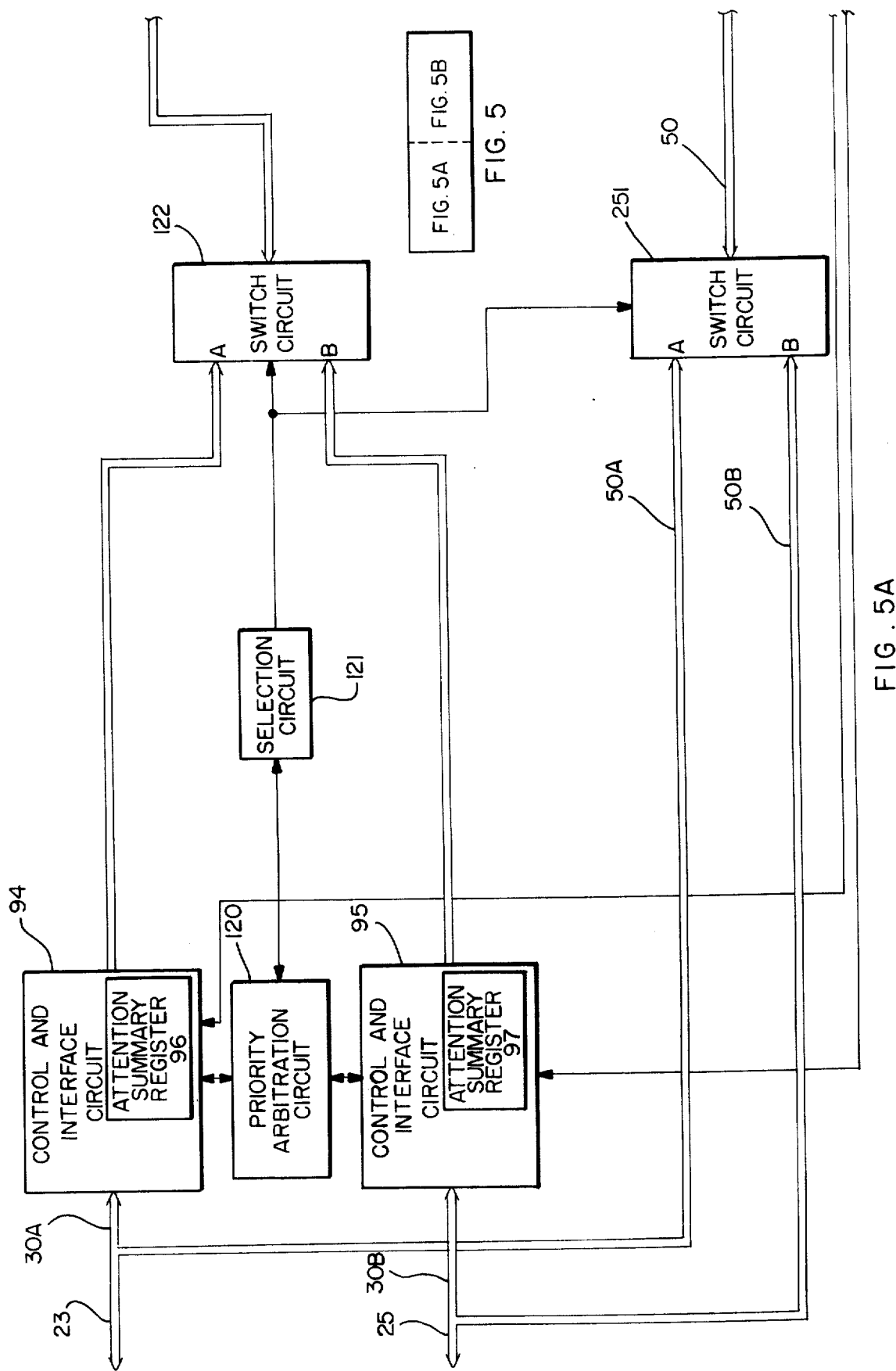

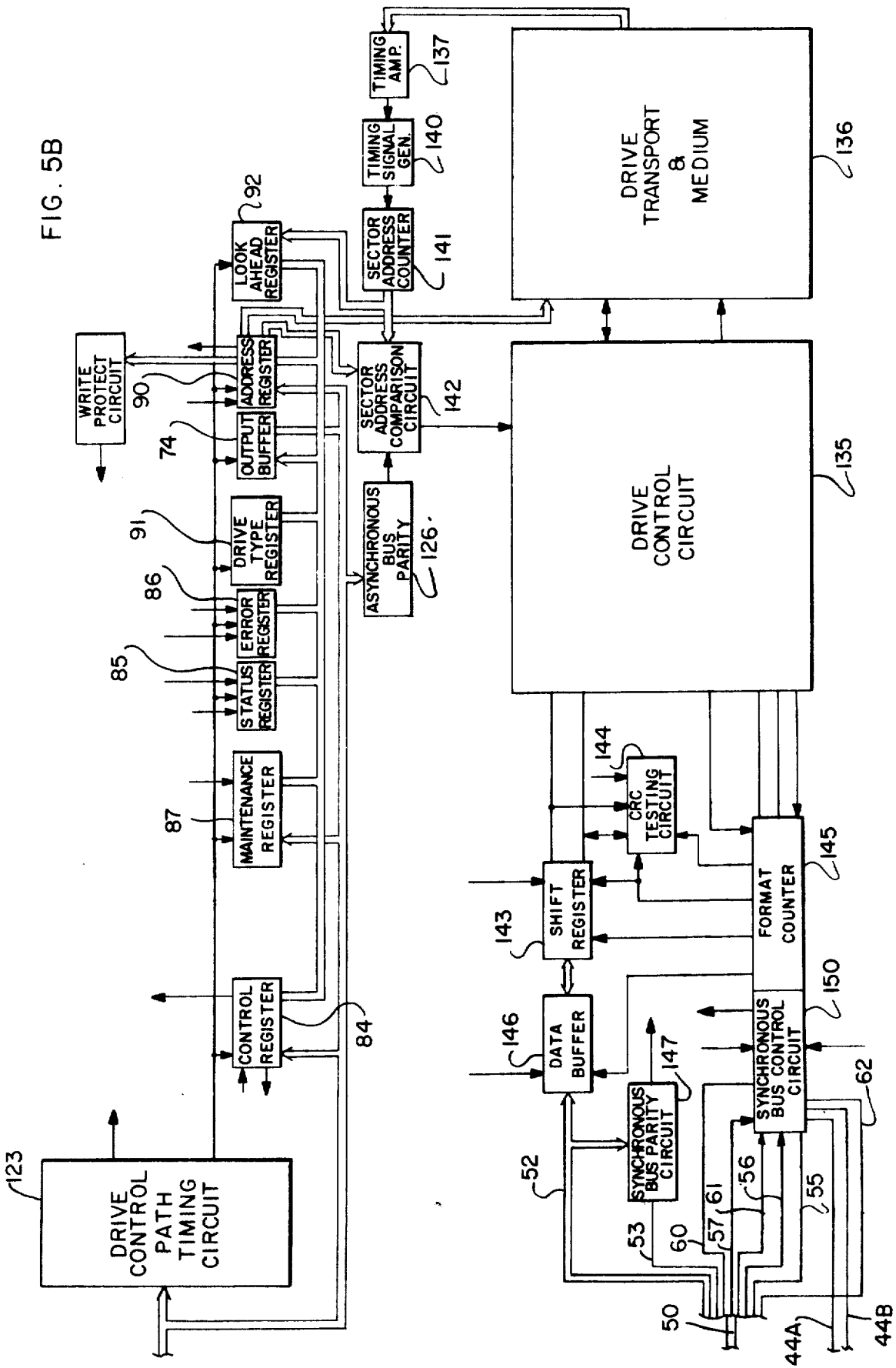

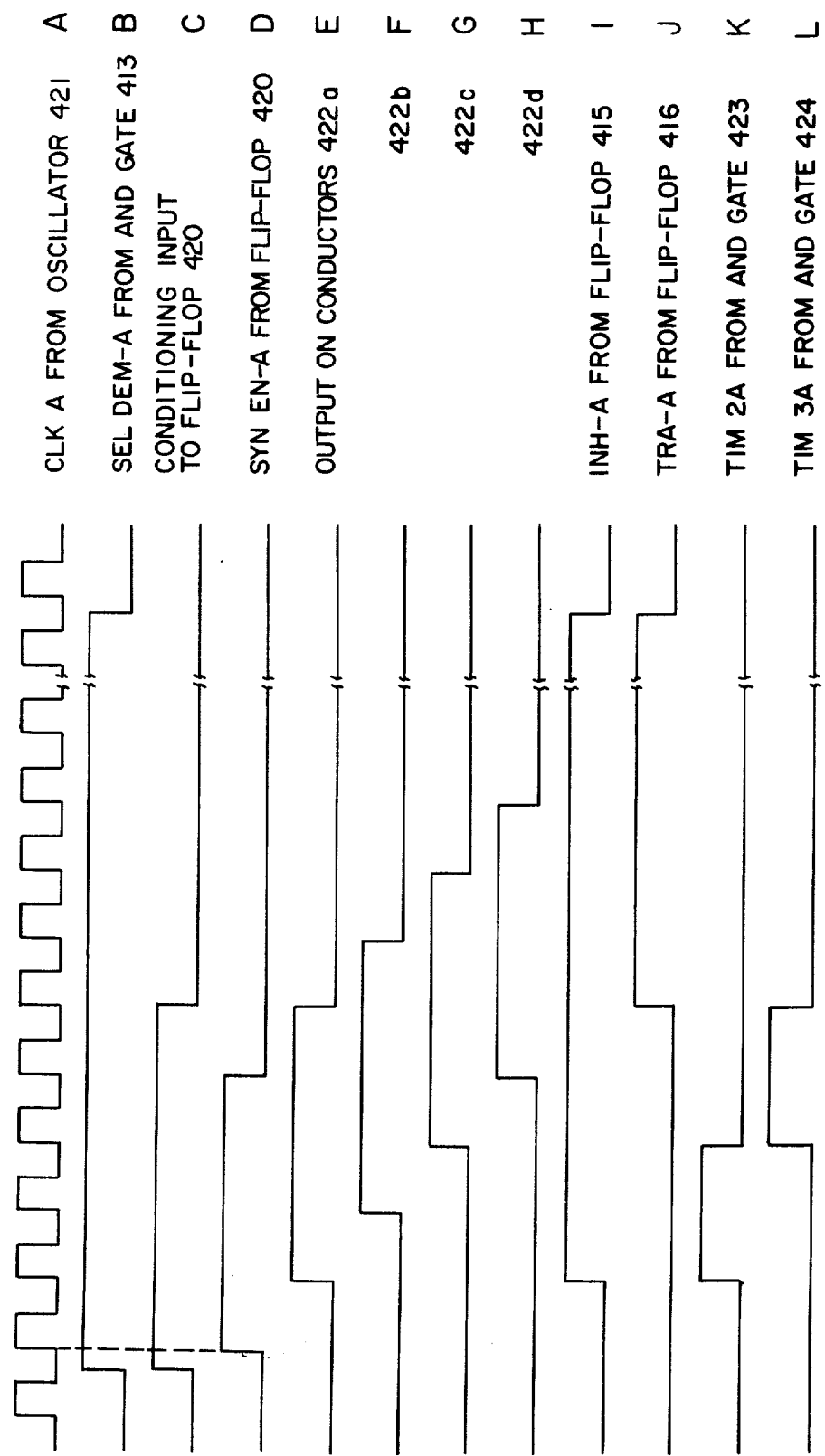

DRIVE FOR CONNECTION TO MULTIPLE CONTROLLERS IN A DIGITAL DATA SECONDARY STORAGE FACILITY

BACKGROUND OF THE INVENTION

This invention generally relates to data processing systems and more specifically to secondary storage facilities connected in such systems.

Secondary storage facilities comprise elements which are not an integral part of a central processing unit and its random access memory element, but which are directly connected to and controlled by the central processing unit or other elements in the system. These facilities are also known as "mass storage" elements and include magnetic tape memory units, disk units and drum units.

These facilities are also termed "sequential access storage units" because the information stored in one of these units becomes available, or stored, only in a "one-after-the-other" sequence, whether or not all the information or only some of it is desired. For example, it is usual practice to retrieve information from a disk unit on a "sector-by-sector" basis, even though only one of several information records in a sector is needed. Similarly, a physical record on a tape is analogous to a sector on a disk and a complete physical record may be retrieved even though it may contain more than one relevant information record.

These devices are also "serial storage devices." In a serial storage device time and sequential position are factors used to locate any given bit, character, word or groups of words appearing one after the other in time sequence. The individual bits appear or are read serially in time.

In modern data processing systems a secondary storage facility includes a controller and one or more drives connected thereto. The controller operates in response to signals from the data processing system, usually on an input/output bus which connects together other elements in the system including the central processing unit. A drive contains the recording medium (e.g., tape or a rotating disk), the mechanism for moving the medium, and electronic circuitry to read data from or store data on the medium and also to convert the data between serial and parallel formats.

The controller appears to the rest of the system as any other system element on the input/output bus. It receives commands over the bus which include command information about the operation to be performed, the drive to be used, the size of the transfer, the starting address on the drive for the transfer, and the starting address in some other system element, such as a random access memory unit. The controller converts all this command information into the necessary signals to effect the transfer between the appropriate drive and other system elements. During the transfer itself, the controller routes the data to or from the appropriate drive and from or to the input/output bus or a memory bus.

In most prior secondary storage facilities, a controller connects to one or more drives, but a drive connects only to one controller. A single controller performs a data transfer with only one drive at a time. A single controller may effectuate control operations in different drives simultaneously. These control operations, for example, include, in a disk memory drive, repositioning the reading and writing means and, in a tape drive, advancing the tape to a new position. It is characteristic of control operations that none of them involve the transfer of data to or from the storage medium.

Once a data transfer does begin, a controller dedicates a transfer section to that specific operation. The controller can not connect its transfer section and other drives until the operation terminates. All other drives remain idle, even though one or more of the idle drives may be conditioned to receive or send data.

This limitation in prior systems reduces the rate at which data can be transferred. For example, in a facility comprising several disk memory drives, when a command for performing a data transfer is processed, on the average, at least one-half disk revolution must occur before the actual transfer can begin. This introduces "a latency delay," known as a "rotational latency delay" in a disk drive. In fact, the maximum rotational latency delay is the interval required for one complete disk revolution. These latency delays can significantly reduce the efficiency of the data processing system by limiting the rate at which data is transferred to or from the drive.

There are now data processing networks which comprise, as network components, entire data processing systems. Each data processing system in such a network may include its own secondary storage facility. In other networks, a single data processing system may contain a secondary storage facility for the entire network. In order to fully utilize these networks in whatever form, it is necessary to interchange data between systems in the network. With prior facilities, each such interchange could require two or more transfers. For example, in a network involving a single secondary storage facility, there might be a first transfer from the facility to a random access memory in the first system and then a second transfer from that memory to a memory associated with another system which was to utilize the information. Such interchanges complicate the programming that is necessary and also detract from the overall network operating efficiency.

Recently introduced drives can connect to different controllers as a solution to minimize these problems. In one embodiment of a facility including such a drive, the controllers are unchanged. A drive contains all the necessary switching circuits. The drive comprises one status register corresponding to each controller. The system connected to each controller can retrieve the contents of a corresponding drive status register at any time. One stage of each status indicates whether the drive is available to the corresponding controller and system. These stages are cross-coupled to prevent one system from initiating any control or transfer operation while the drive is busy with another controller.

If a system retrieve the contents of the corresponding status register in these drive systems and the drive is busy with another controller, the controlling program must note that fact and return at some later time to see if conditions change. This requirement complicates programming and reduces the overall operating efficiency of the system.

Therefore, it is an object of this invention to provide a secondary storage facility in which a drive can connect to a plurality of controllers.

Another object of this invention is to provide a secondary storage facility in which the rate of data transfers can be improved.

Still another object of this invention is to provide a secondary storage facility that is adapted for interconnection in data processing networks to be shared by different data proccessing systems.

Yet another object of this invention is to provide a secondary storage facility to which and from which data transfers can be made more efficiently than in the prior art.

SUMMARY OF THE INVENTION

In accordance with this invention, a drive connects to two controllers and includes priority arbitration and controller selection circuits. If a data system attempts to retrieve data from any of several drive registers through a first controller, while the drive is actually connected to the second controller, the drive transmits back through the first controller to its system a unique code that indicates the non-availability of the drive to the first system. If the first system tries to retrieve data from one register or tries to alter the contents of any register, while the drive is connected to the second system, the priority arbitration circuit immediately connects the drive to the first system when the transfer with the second system is completed.

This invention is pointed out with particularity in the appended claims. A more thorough understanding of the above and further objects and advantages of this invention may be attained by referring to the following description taken in conjunction with the accompanying drawings.

BRIEF DESCRIPTION OF THE DRAWINGS

FIG. 5, comprising FIGS. 5A and 5B, is a block diagram of a drive constructed in accordance with this invention;

FIG. 13 is a chart of timing signals useful in understanding the operation of circuits in FIGS. 12A through 12D.

DESCRIPTION OF AN ILLUSTRATIVE EMBODIMENT

I. GENERAL DESCRIPTION

Figure 1:
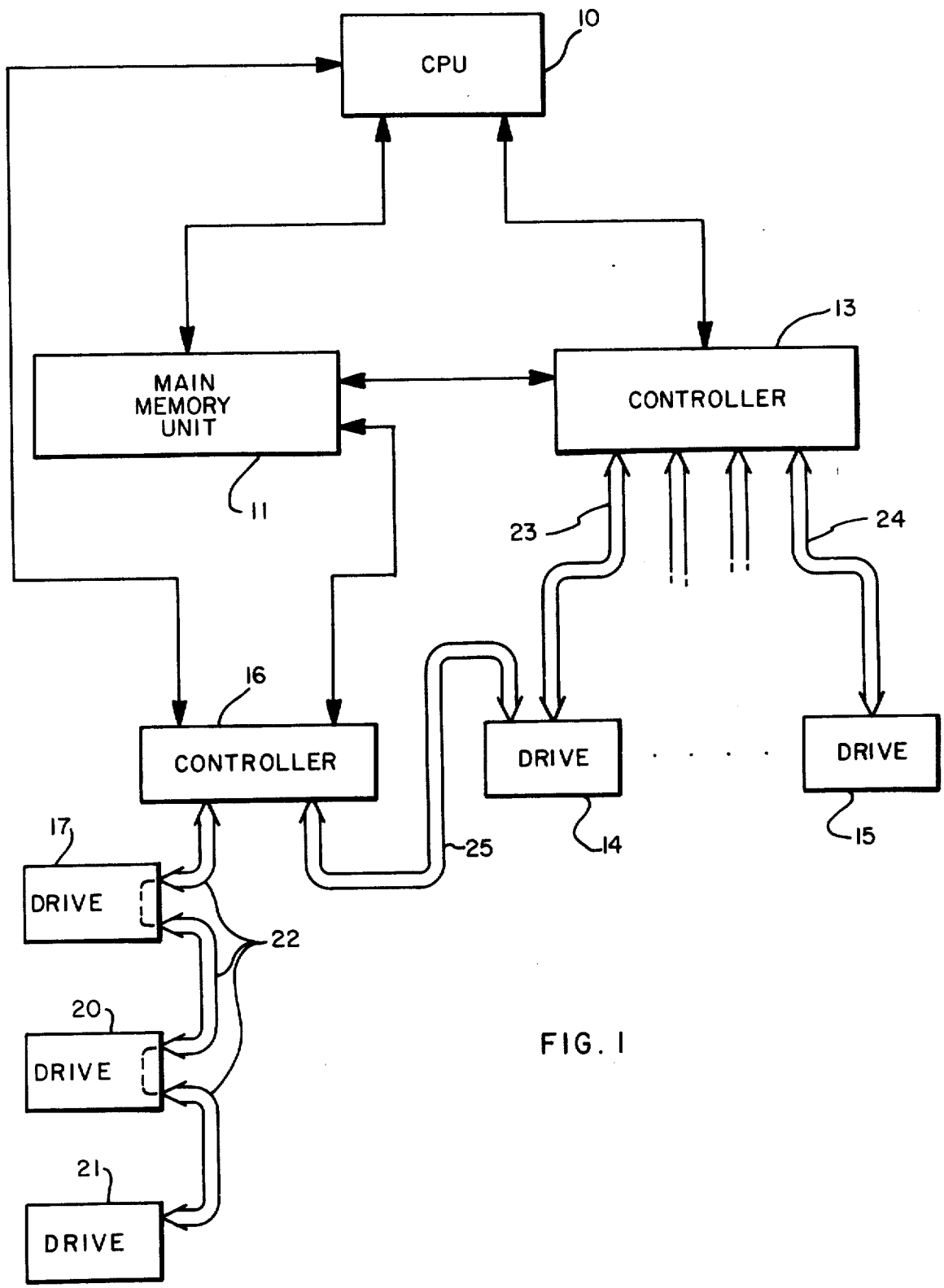
FIG. 1 is a generalized block diagram of a data processing system adapted to use this invention.

FIG. 1 depicts the general organization of a data processing system comprising a central processing unit (CPU) 10 and a main memory unit 11, normally a random access memory unit. Information also may be transferred to or from a secondary storage facility including a controller 13 and several drives, drives 14 and 15 being shown by way of example. Another such storage facility includes a controller 16 and drives 17, 20 and 21. This facility is also coupled to the central processing unit 10 and the main memory unit 11.

As previously indicated, a "drive" includes a recording medium and the mechanical and electrical components for recording data on or reading from the recording medium in the context of this invention. For example, it can comprise a fixed or movable head disk memory unit, a magnetic drum memory unit or a magnetic tape unit, as well as non-mechanically driven memory units. Timing signals derived from the medium normally synchronize data transfers with movement of the medium. A typical drive contains control, status, error and other registers for controlling and monitoring drive operations.

A controller 13 or 16 may be located physically separately from the central processing unit 10 as shown in FIG. 1 or may be an integral part of a central processing unit. Controllers serve as "interfaces" beteen the central processing unit and the drive. They contain the circuits for exchanging data with either the central processing unit 10 or the main memory unit 11. Buffer registers in the controller 13 or 16 compensate for the usually different transfer rates between the controller and main memory unit 11, on the one hand, and between the controller and drive, on the other hand.

Drives are connected to controllers by means of device buses in several different configurations. If, for example, the controller 16 were connected to drive 17 only, the arrangement would be termed a "single drive" configuration. Actually, as shown in FIG. 1, the drives 17, 20 and 21 are interconnected by a device bus 22 which is threaded from one drive to the next. This is an example of a "daisy-chain" configuration. Device buses 23 and 24 connect drives 14 and 15, respectively, in a "radial" configuration. In accordance with this invention, drive 14 is also linked to the controller 16 by means of a device bus 25. Thus, the drive 14 is in a "dual controller-single drive" configuration in which it responds to signals from the controller 13 over the device bus 23 or from the controller 16 over the device bus 25. As will become apparent, this invention is adapted for use in many different secondary storage facilities.

Further, the circuits for implementing this invention normally will be physically located as an integral part of a drive. In this way, no changes need be made to a controller. Although the controller and specific embodiment of a drive form no part of this invention, it is helpful to describe a specific controller and drive. Thus, the signals which pass over a device bus will be described using device bus 23 as an example. Then the transfer of control information and data between a controller and drive is explained using the controller 13, drive 14 and device bus 23 by way of example. Once these operations are explained, the organization and specific implementation and operation of one embodiment of the drive 14 is described.

II. THE DEVICE BUS

Figure 2:
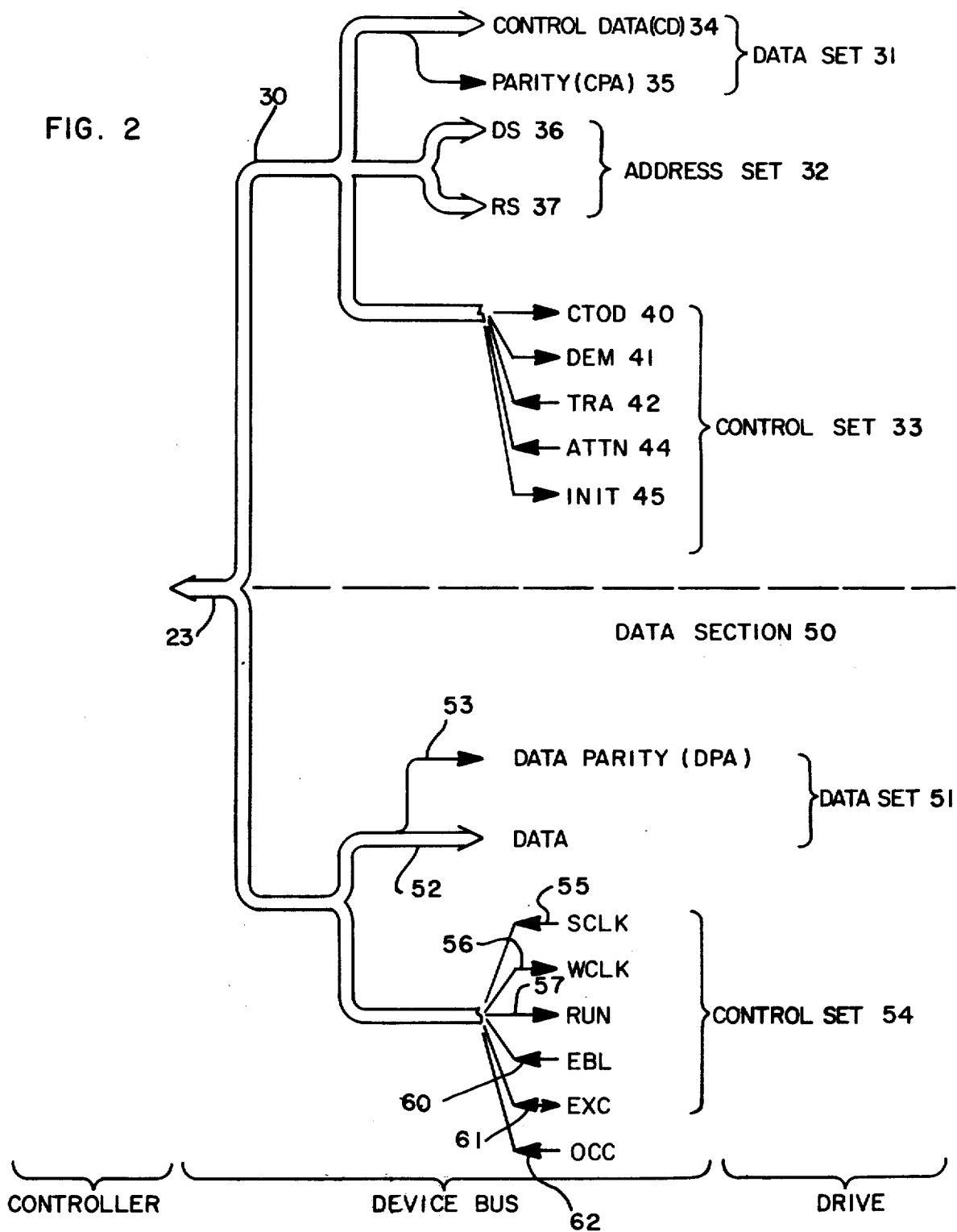
FIG. 2 depicts an interconnecting bus between a drive and a controller.

The device bus 23, with the signal designations, is shown in FIG. 2 and the same mnemonics identify wires and the signals they carry. Every device bus has the same construction. A drive control section 30 contains conductors segregated into a data set 31, an address set 32 and a control set 33. Within the data set 31 there are bidirectional control data (CD) wires 34 andd a bidirectional control data parity (CPA) wire 35 for carrying control and status information between a controller and any of its respective drives. The CPA wire 35 carries a parity bit. The control information includes commands which control the operation of the drive. Some of the commands initiate data transfers and include READ, WRITE an WRITE CHECK commands. Other commands initiate control operations such as positioning heads in a movable head disk drive, winding a tape in a magnetic tape drive or clearing registers in a drive.

Within the address set 32, there are drive selection (DS) wires 36 and register selection (RS) wires 37. The DS wires 36 carry DS signals from the controller to provide information for selecting a drive for an ensuing transfer of control or status information. The controller also transmits the RS signals. Within the drive identified by the DS signals, the RS signals define specific register which is to be involved in a transfer.

The control set 33 includes a controller-to-drive transfer (CTOD) wire 40. When a controller asserts a CTOD signal (i.e., a logic ONE signal level), the following transfer over the data set 31 is from the controller to the selected register in the selected drive. When the CTOD signal is not asserted, (i.e., is at a logic ZERO signal level), the transfer is from the selected drive register to the controller.

A demand (DEM) wire 41 and a transfer (TRA) wire 42 carry asynchronous timing signals. Specifically, the controller transmits a DEM signal onto the wire 41 to initiate a transfer of control information. The selected drive transmits the TRA signal to indicate the receipt of control information or the availability of status information.

Whenever any drive requires some interaction with the controller and data processing system, it transmits an ATTN signal onto a single ATTN wire 44 which is common to all drives. Usually the controller responds by interrupting the data processing system.

An INIT signal on a wire 45 serves as a facility resetting signal. Upon receipt of the INIT signal, a drive immediately terminates its operation, clears all error conditions and becomes available to the controller and system for further operations.

A synchronous data section 50 shown in FIG. 2 carries blocks of data at high transmission speeds between the controller and drives. These blocks of data are carried in response to READ, WRITE and WRITE-CHECK commands previously sent to a controller and its respective drive with related transfers occuring over the control section 30. The data section 50 also serves as a link for control signals which initiate and terminate the block transmissions. Bidirectionally conducting wires in a data set 51 comprise data wires 52 for carrying the data itself and a data parity (DPA) wire 53. A control set 54 includes a SCLK wire 55 and a WCLK wire 56. The drive uses timing signals derived from the recording medium to produce SCLK signals on the SCLK wire 55 to synchronize the reading of data from the data wires 52 and DPA wire 53 when the data moves to the controller. When the data is to be stored in the drive, the controller receives SCLK signals and transmits WCLK signals back to the drive. The WLCK signals control the writing of data onto the recording medium in the device.

A RUN signal controls the initiation of a data transfer and the overall duration of the transfer; it appears on a RUN wire 57. The controller asserts the RUN signal to start a data transfer in accordance with a command which was previously transferred to the drive over the drive control section 30. Subsequently, circuits in the drive use the RUN signal to determine the time for terminating the transfer.

An EBL signal transmitted by the drive on a wire 60 signals the end of a "block." Any transfer terminates if, at the end of an EBL signal, the RUN signal is not asserted. Otherwise, the transfer operation continues through the next "block." In this connection the term "block" has a conventional meaning as applied to magnetic tape memory units and is equivalent to a "sector" as that term is conventionally applied to magnetic disk memory units. Thus, in this description, "block" is used in a generic sense to indicate a conveniently sized group of data bits to be sent as a unit.

An EXC wire 61 in the synchronous data section 50 is a bidirectional wire for carrying exception (EXC) signals. When the drive transmits the EXC signal, some error has occurred during the transmission. An EXC signal from the drive will cause the transfer to terminate immediately if the error is serious. Otherwise, it remains asserted until the last EBL signal during the transfer terminates. An EXC signal from a controller causes the drive to terminate any action it was performing in response to a command.

There is also an occupied (OCC) wire 62. Whenever a drive begins to perform a data transfer over the synchronous section 50, the drive transmits an OCC signal to a controller. This positively indicates that a drive connected to that controller is busy with a data transfer.

Figure 3:
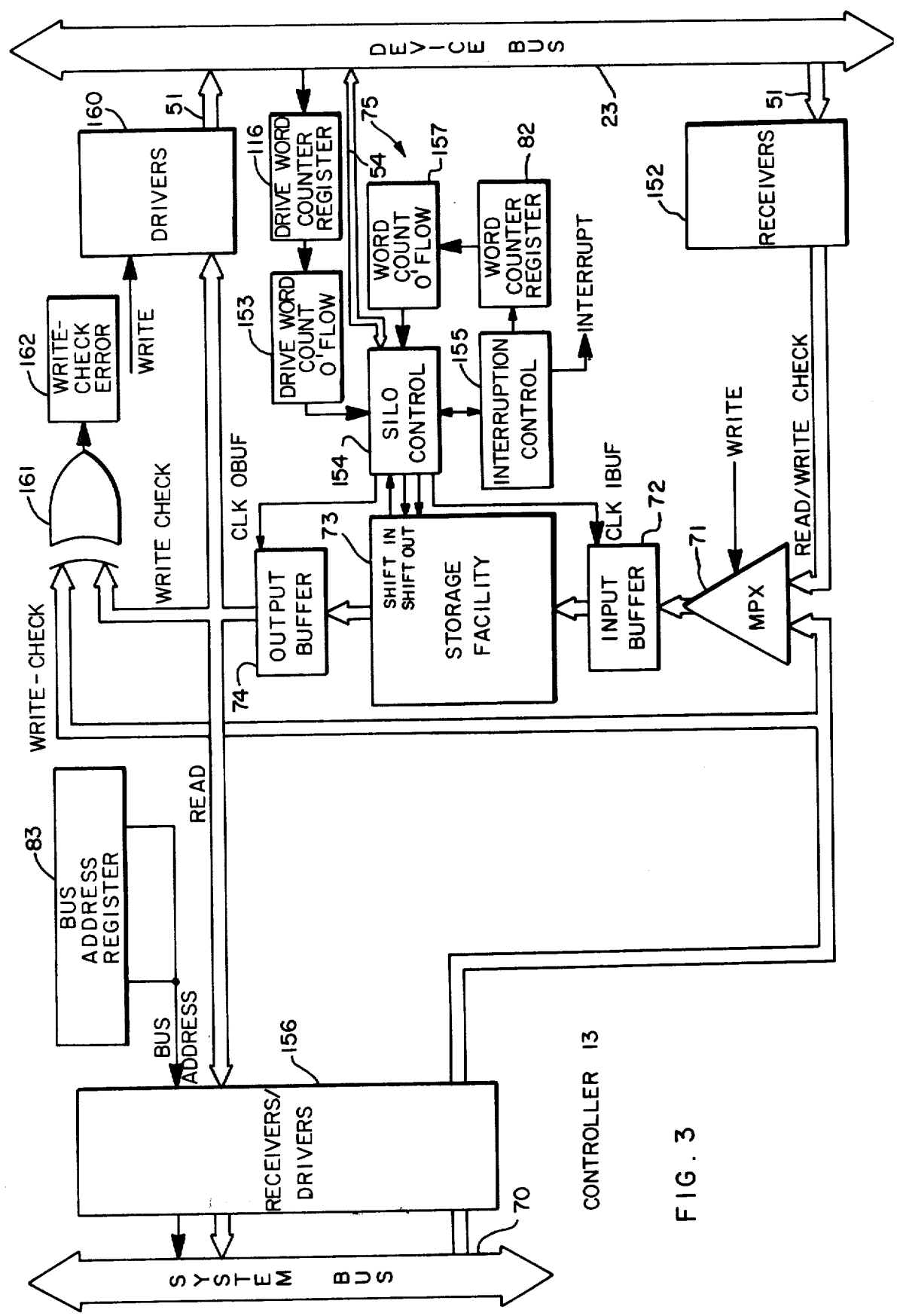
FIG. 3 is a block diagram of a synchronous data path in a controller as adapted for connection to a system such as shown in FIG. 1.

Before describing the operation of the circuits in FIG. 3 in more detail, it will be helpful to discuss the operation of a typical drive control path and the circuits which both the controller (FIG. 4) and the drive (FIGS. 5A and 5B) contain.

III. CONTROLLER OPERATION

Looking first at the synchronous data path in FIG. 3, the facility is limited because only one drive connected to a controller may respond to a READ, WRITE or WRITE-CHECK command at any given time. If the data section 50 (FIG. 2) were to receive data signals from all the drives the controller 13 supervises simultaneously, the data could not be separated. Data transfers pass between a system bus 70 and the device bus 23, which is one drive bus which connects to the drive 14. Reference numerals used to designate wires in FIG. 2 are applied to corresponding wires shown in other FIGURES; if a FIGURE shows both device buses 23 and 25, then a reference numeral has appended thereto as a suffix A if the wire is in bus 23 and a B if the wire is in device bus 25. For example, 34A designates the control data wires in bus 23 while 34B designates the control data wires in device bus 25.

Incoming data from either a system bus 70 in response to a WRITE command or the data section 51 of the device bus 23 in response to a READ or WRITE-CHECK command is loaded through a multiplexer 71 into an input buffer 72 for transfer into a storage facility 73. Each work passes through the facility 73. The words then pass into an output buffer 74. A data path control circuit, generally 75, then either effects a transfer onto the device bus 23 for transfer to the drive 14 (FIG. 1) or a transfer onto the system bus 70 for transfer to a designated location in the data processing system. The controller 13 also contains the necessary circuits for generating the appropriate address signals to identify a memory location which either stores the data to be transferred to the controller 13 or which is to receive the data from the drive 14.

IV. DRIVE CONTROL PATH

Figure 4:
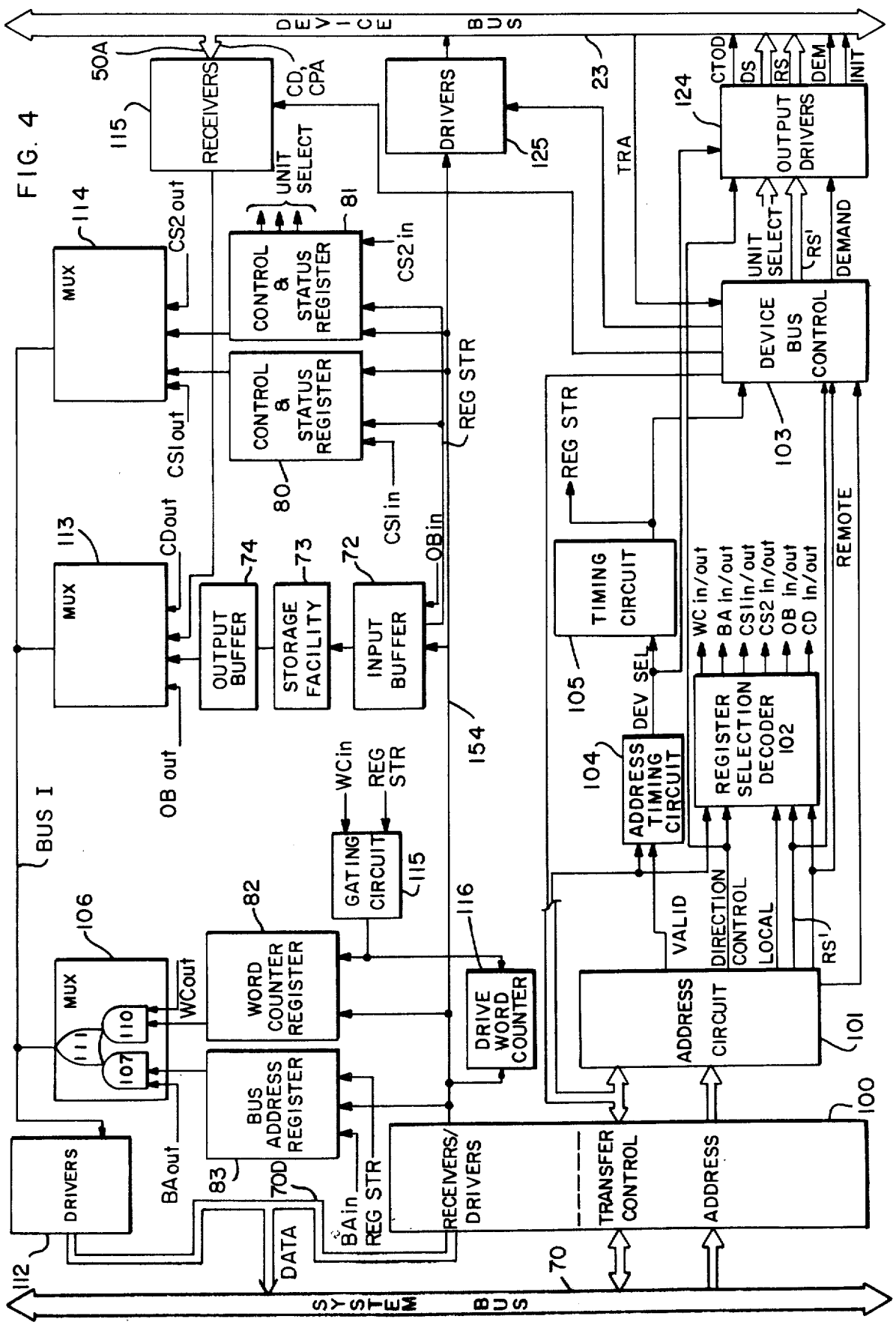
FIG. 4 is a block diagram of an asynchronous drive control path in a controller adapted for connection to a system as shown in FIG. 1.

A typical drive control path is shown in FIGS. 4, 5A and 5B. The controller shown in FIG. 4 contains several registers, which are called "local" registers. They include:

1. Control and status registers 80 and 81 for receiving commands and for receiving and storing operational status information for the controller;

2. The output buffer 74; this register (shown also in FIG. 3) has a connection to the drive control path and its contents may be retrieved under system control for diagnostic and other purposes;

3. A work counter register 82 for storing the number of words to be transferred; it counts each data word as it is transferred and disables the drive upon the completion of the transfer;

4. A bus address register 83 for storing the address of a location connected to the system bus 70, which is either sending or receiving the data.

FIGS. 5A and 5B depict a fixed-head disk memory unit as a typical drive for purposes of explanation. Such a drive contains the following registers, which are called "remote" registers and shown in FIG. 5B:

1. A control register 84 analogous to the control and status register 80 (FIG. 4); it stores commands and other control information; the control register 84 and the control and status register 80 can be considered as a single register in which stages are distributed among the controller and each drive connected to the controller;

2. A status register 85 for storing non-error status bits and a summary error bit; one bit position, for example, indicates whether the drive is in a ready state;

3. An error register 86 for storing error information; other drives may contain more than one such register;

4. A maintenance register 87 for storing information useful in diagnostic and maintenance operations;

5. A desired track and sector address register 90 for storing the number of the drive track and sector at which a transfer is to start;

6. A drive type register 91 for storing information concerning the nature of the drive; and 7. A look-ahead register 92 for storing information concerning the instantaneous rotational position of the disk with respect to the heads.

Other registers which might be included in a fixed-head or other type of drive include:

1. A serial number register for displaying part or all of the device serial number; and 2. ECC position and pattern registers in drives having error-correcting codes for storing the position of the ECC pattern burst and the pattern itself.

Moving-head magnetic disk memory units may include:

1. An offset register for storing the amount of head offset in a moving head disk memory unit; such a register might also store information for controlling the enabling of header information or error correction circuits.

2. A desired cylinder address register for storing the cylinder address which is to be reached; and 3. A current cylinder address register for storing the actual head position over the disk in terms of a disk cylinder.

Another remote register is located in each of control and interface circuits 93 and 94 shown in FIG. 5A. These circuits connect respectively to the control sections 30A and 30B of device buses 23 and 25. Each of circuits 94 and 95 includes, respectively, a stage in attention summary registers 96 and 97 for indicating to each of the controllers 13 and 16 whether the drive has generated an ATTN signal. These attention summary registers can be considered as having individual stages distributed among each of the drives. The operation of these registers is described more fully later.

All operations of the controller and drives in a secondary storage facility constructed in accordance with this invention are under the control of information stored in these registers in the controller (FIG. 4) and the drive (FIG. 5B). For example, a transfer of data between the recording medium and a memory unit requires the central processing unit to transfer several items of information into the local and remote registers. The identification of the drive to be involved in the transfer is loaded into the control and status register 81 (FIG. 4). The register 81, in turn, produces corresponding UNIT SELECT signals. The bus address register 83 receives the initial memory address while the word counter register 82 receives a number (usually in two's complement) defining the number of data words in the block to be transferred.

Once the control and status register 81 contains the drive information, additional transfers are made to specific remote registers in that drive (FIG. 5B). The track and sector address is loaded into the track and sector address register 90. If the disk were a moving-head disk, then other information might be loaded into offset and desired cylinder registers. Still other information concerning the function to be performed would be loaded into the control register 84. As apparent, each of these transfers involves operations for loading information into drive registers from one of the control sections 30A or 30B in the device buses 23 and 25 respectively. Thus, they can be designated "writing" operations.

It is also necessary, from time to time, to retrieve the contents of certain registers to learn the status of the drive and controller (i.e., perform a "reading" operation). For example, the status register 85 contains a DRY bit position which indicates whether the drive is busy. The look-ahead register 92 may be read to determine the instantaneous position of the disk.

Any time there is to be a transfer into or from a local or remote register, address signals and transfer control signals appear on the system bus 70 shown in FIG. 4 including one set of direction control signals which indicate whether the transfer involves a reading or writing operation. For example, the transfer control signals discussed in U.S. Pat. No. 3,710,324 include CO and Cl direction control signals. CONI and CONO signals discussed in U.S. Pat. No. 3,376,554 perform the same function. When the information is to move into a register, the information may appear on the system bus data lines simultaneously with or slightly after address and transfer control signals appear on the address and transfer control lines, depending upon the characteristics of the particular system.

Receivers 100 in a controller (FIG. 4) comprise buffer circuits and pass the address signals and direction control signals to an address circuit 101. Each register has a unique address which the address signals designate and the address circuit 101 uses the address signals to indicate whether the address is for a register in the controller or in an associated drive. Thus, these signals implicitly indicate whether the designated register is a local or remote register and the address circuit 101 produces a corresponding LOCAL or REMOTE signal. Register selection signals (RS') from the circuit 101 pass to a register selection decoder 102 and to a device bus control circuit 103.

A. LOCAL TRANSFERS

When the address signals indicate that a register in the controller is to be selected (i.e., the address circuit 101 generates a LOCAL signal), the decoder 102 subsequently produces a signal which selects both the local register and the direction of the transfer. Each "conductor" from the decoder 102 is really two wires; one wire corresponds to a writing operation; the other, a reading operation. Thus, the decoder produces a "WCin" selection signal when a word count is to be stored in the word counter register 82. To read the contents of the word counter register 82, the decoder would produce a "WCout" selection signal.

Other transfer control signals from the bus 70, usually delayed for some period following the appearance of the address signals, enable the decoder 102 to produce an appropriate selection signal and enable an address timing circuit 104. These transfer signals may be either DATI, DATO, CONI or CONO signals in the system described in U.S. Pat. No. 3,376,554 or MSYN and SSYN signals in the system described in U.S. Pat. No. 3,710,324. The address timing circuit 104 produces a delayed DEV SEL signal in response to a first synchronizing signal if the address circuit has validated the incoming address and produced a VALID signal. The DEV SEL signal energizes a timing circuit 105. The timing circuit 105 transmits a REG STR pulse after the appearance of a signal from the decoder 102 and, in a writing operation, loads information on data wires 70D from the bus 70 through the receivers/drivers 100 into the selected local register. The timing circuit 105 may also couple the DEV SEL signal to the device bus control circuit 1:3 to produce another transfer control signal on the system bus 70 to indicate that the transfer is complete (when such a signal is necessary for a system operation).

To read the contents of the word counter register 82, for example, the address and transfer control signals cause the decoder 102 to transmit the WCout selection. This signal is one input to a multiplexer 106 which selectively couples the output of either the word counter register 82 or the bus address register 83 onto an intermediate bus designated BUSI. Specifically, the multiplexer 106 includes an AND gate 107 which receives the output from the bus address register 83 and an BAout signal from the decoder 102 and an AND gate 110 which receives the output of the word counter register 82 and the WCout signal from the decoder 102. An OR gate 111 couples the selected one of the AND gates 107 and 110 onto the BUSI bus and then, through drivers 112, onto data conductors 70D in the system bus 70.

The multiplexer 106 is shown diagramatically only. In an actual circuit there would be an AND gate associated with each bit position in each of the registers 82 and 83. The BAout and WCout signals would then enable all the AND gates associated with the respective registers.

The drive control path shown in FIG. 4 also contains multiplexers 113 and 114. Multiplexer 113 selectively couples signals onto the BUSI bus either from the output buffer 74 or from the drive coupled from the device bus through receivers 115 in response to OBout or CDout signals from the decoder 102. CS1out and CS2out signals from the decoder 102 control the multiplexer 114 so it selects and couples the output of either the register 80 or the register 81 onto the BUSI bus.

While reading control information from a local register, the device bus control circuit 103 may, if the system requires it, issue another synchronizing control signal which indicates the transfer is complete. Once the REG STR signal terminates and the optional synchronizing control signal appears, the controller and system have completed the transfer (i.e., the selected local register has been read).

The steps for loading information into a local register are similar. The direction control signals from the address circuit 101 indicate a writing operation. Thus, an input conductor for a selected register, rather than a multiplexer, is energized by the decoder 102. When new information is to be stored in the word counter register 82, the decoder 102 produces the WCin signal. The information to be stored appears on the bus 70D. The coincidence of the REG STR and WCin signals loads the word counter register 82.

Normally the selection signal from the decoder 102 and the REG STR signal from the timing circuit 105 are applied directly to input gating circuits in their respective registers. FIG. 4, however, shows a gating circuit 115 whose output is applied to both the register 82 and a drive word counter register 116. The register 116 stores the number of words transferred between the controller and drive. As shown in FIG. 4, this register is not connected to the BUSI bus, so its contents cannot be read.

Thus, transfers of control information to or from local registers use the same sequence as the transfer of similar information to or from analogous registers in other units connected to an input-output bus or a common bus as disclosed in the previously identified patents. When the transfer involves a remote register, the controller must route the control information to involve the appropriate remote register. The control information still passes through the controller, but the controller must additionally control each transfer with the designated register.

B. REMOTE TRANSFERS

As previously indicated, two controllers connect to a single drive in accordance with this invention. FIG. 5A shows control and interface circuits 94 and 95 together with a priority arbitration circuit 120, a selection circuit 121 and a switch circuit 122 which effectively connects one of the device buses 23 or 25 to the remainder of the drive control path shown in FIG. 5B including a drive control path timing circuit 123. To understand how control information is transferred to and from the circuits in FIG. 5B, it is helpful to merely consider that device bus 23, and all its signals on the control section 30A, connects to the drive.

When an address on the system bus 70 in FIG. 4 designates a register in a drive, the address circuit 101 produces a REMOTE signal which is applied to the device bus control 103. In response to this signal the device bus control 103 is enabled to pass the RS' signals from the address circuit 101 to output drivers 124. The UNIT SELECT signals from the control and status register 81 and the direction control signals are also inputs to the drivers 124.

The appearance of a valid address, with its concomitant VALID signal, and the transfer synchronizing signal from the system bus 70 produces the DEV SEL and the REG STR signals as previously discussed. The DEV SEL enables the output to the output drivers 124 to couple the RS', UNIT SELECT, and direction control signals onto wires in the control set 33 of the device bus 23 as RS, DS and CTOD signal respectively. In addition, the REG STR signal causes the device bus control 103 to produce a DEMAND signal which passes through the enabled output drivers 124 as the DEM signal.

Now referring to FIG. 5A, each of circuits 94 and 95 include means that form part of an overall bus connection means to which the device buses from the different controllers connect. The signals depicted in FIG. 2 are all coupled through these bus connection means. For example, a drive selection decoder in each of the circuits 94 and 95 compares the incoming DS signals at the bus connection means with signals from drive selection switches to determine whether the DS signals identify that particular drive. If they do, the decoder activates a register selection decoder and a control section timing unit so the register selection decoder produces signals which are coupled to the selected register in the drive, e.g., registers 84, 85, 86, 87, 90, 91 or 92 (FIG. 5B). These selection signals enable subsequent timing signals from the drive control path timing circuit 123 to effect a transfer. The circuits 94 and 95 also receive the DEM and CTOD signals from the buses 23 and 25 and transfer a TRA signal onto the bus in response to a DEM signal to indicate, normally, that the selected drive has moved control information onto or from the data set 31A or 31B.

Assuming that the controller in FIG. 4 initiated the transfer and referring again to that Figure, the device bus control 103 receives the TRA signal and then either enables data to pass through the receivers 115 in response to the CDout signal from the register selection decoder 102 or enables drivers 125 if the decoder has produced the CDin signal. In addition, the control 103 can produce the previously discussed optional synchronizing signal for controlling the transfer between the system and the controller. Thus, the decoder 102 produces a CDin or CDout signal during each remote register transfer.

A more thorough understanding of these remote register transfers will be obtained from a discussion of reading and writing operations in some detail in terms of the signal transfers between the controller in FIG. 4 and the registers in FIG. 5.

1. READING OPERATION

Figure 6:
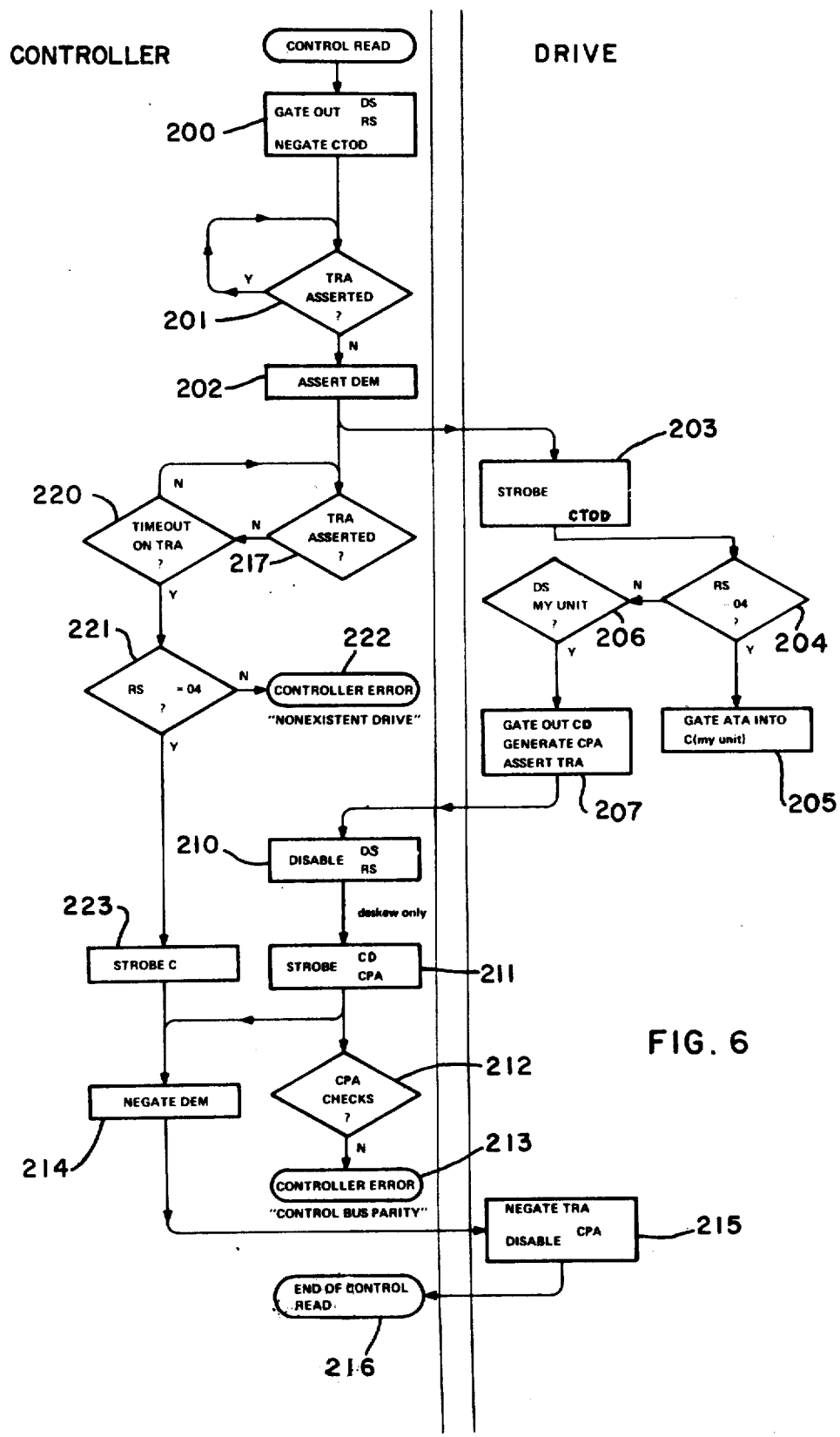
FIG. 6 is a flow chart of the operation for retrieving information in a register shown in FIG. 5.

FIG. 6 is a flow chart of the steps necessary to read control information in a remote register. Step 200 represents the process of placing the appropriate values of the DS, RS and CTOD signals onto the device bus 23 from the output drivers 124 shown in FIG. 4. If a TRA signal from a previous transfer with any drive connected to the controller is asserted, the controller waits for it to terminate as represented by step 201. At the completion of this interval, step 202 indicates that the device bus control 103 and the output drivers 124 couple the DEM signal onto the device bus 23.

Now referring to FIGS. 5A and 6, the signals on DS, RS and CTOD wires from the controller arrive at the drive on bus 23 after a bus propagation delay. After a similar delay, the DEM signal is received at the drive, causing the control and interface circuit 94 to load (or strobe) the CTOD signal as represented by step 203. A register selection decoder in the control and interlace circuit 94 determines whether the RS signals designate the attention summary register 96 identified by RS signals with a value $04_8$. If they do, step 204 diverts to step 205, and the control circuit 94 transmits the contents of the stage it contains onto an appropriate one of the CD wires 31A (FIG. 4) in the bus 23. If another register is designated, step 204 diverts to step 206. Then, in the selected drive, step 206 diverts to step 207, and the control and interface circuit 94 together with the timing circuit load data onto the data set 31A. If controller 13 (FIG. 1) is connected, this data represents the actual contents of the selected register. Otherwise, the data is a unique code which indicates, to the system attached to the controller 13, that the drive is actually connected to the controller 16 and, therefore, unavailable, as described later. At the same time, a control bus parity circuit 126 generates a parity bit which is loaded onto the CPA wire 35A and the control and interface unit 94 transmits the TRA signal.

When the controller receives the control information and the TRA signal, the device bus control 103 in FIG. 4 may immediately disable the DS, RS and CTOD signals (step 210). After a short delay, the device bus control 103 opens the receivers 115 to load the control information and parity signal from the device bus 23 through the multiplexer 113 and drivers 112 onto the system bus 70 (step 211). When the system receives the control information, the control 103 terminates the DEM signal (step 214) so that the drive senses the transition of the DEM signal and terminates the TRA signal (step 215) and the control data and parity signals. Once the controller senses the termination of the TRA signal, the transfer is complete (step 216). As the control information at the receivers 115 in FIG. 4 is valid while the TRA signal is active, the TRA signal therefore can be used to synchronize operations on the system bus 70 and the device bus 23.

Still referring to FIG. 6, once the controller transmits the DEM signal in step 202, it begins timing a response interval. This is represented by steps 217 and 220. If the drive transmits the TRA signal before the predetermined time interval expires, the interval timing operation terminates in step 217. If not, the controller, at the end of this interval, determines whether the corresponding attention summary register is being read (step 221). This is register 96 when the reading operation is initiated over the device bus 23. If it is not, then no device has responded and a non-existent drive has been designated. Thus, step 221 branches to step 222, and the controller sets an NED bit position described later in the control and status register 81 (FIG. 4). If the corresponding attention summary register has been addressed, step 221 branches to step 223, and all the information on the data set 31 is sensed before terminating the DEM signal at step 214.

If a parity error is discovered in step 212 during a transfer of information from a drive (step 211), step 213 causes an MCPE bit position in the status and control register 80 to be set.

2. WRITING OPERATION

Figure 7:
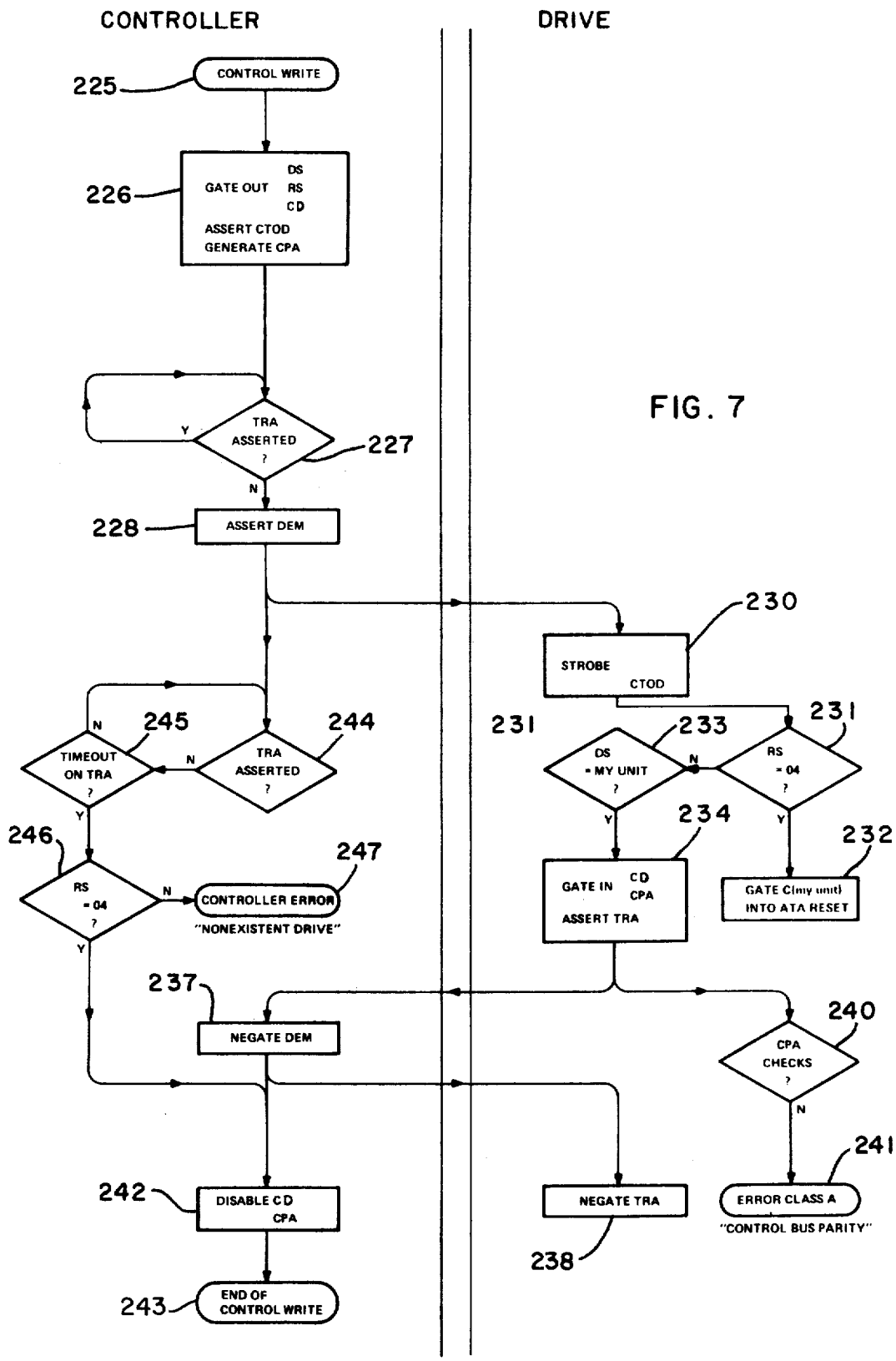
FIG. 7 is a flow chart of the operation for storing information in a register shown in FIG. 5.

FIG. 7 is a flow chart for writing control information into a remote register. When the controller receives a command to write control information (step 225) it transfers DS, RS and CTOD signals onto the control information lines and a parity signal onto appropriate wires in the control section 30. This occurs at step 226. The control information passes through the drivers 125, shown in FIG. 4, under the control of a gating signal from the device bus control 103, which responds to the DEV SEL signal as previously discussed. The control signals pass through the output drivers 124.

If a TRA signal from a previous transfer with any drive connected to the controller is still asserted, the controller waits for it to terminate as shown in step 227 and discussed with respect to the reading operation. Then the controller, in step 228, transmits the DEM signal onto the device bus 23. Steps 230, 231, 232 and 233 are analogous to steps 203, 204, 205 and 206 in FIG. 6. After the control information on the data set 31 arrives at the drive, the DEM signal arrives. In response to these signals, the drive control path timing circuit 123 in the selected drive (FIG. 5B) loads the control information into the designated register and the CPA signal into the parity circuit 126 (step 234). In steps 240 and 241, the circuit 126 provides a parity error signal if an error exists to set a PAR bit position in the error register 86.

The drive also transmits the TRA signal which arrives back at the controller. In response, the device bus control 103 turns off the drivers 125 and the output drivers 124 thereby effectively disconnecting the controller and drive by terminating all signals from the controller on the device bus 23 including the DEM signal. The control information and parity signal from the controller on the data set 31 terminate at the drive as does the DEM signal. In response, the drive terminates the TRA signal and the controller senses this termination to complete the writing operation and to permit initiation of another cycle.

Still referring to FIG. 7, after the controller asserts the DEM signal in step 228, it starts timing a response interval like that in a reading operation. Steps 244, 245, 246 and 247 are analogous to steps 217, 220, 221 and 222 in FIG. 6. If the corresponding attention summary register is being loaded, then the information remains on the control data wires until the end of the time-out period. The controller then completes the writing operation by removing the control information in step 242 to complete the operation with step 243.

C. LOCAL AND REMOTE REGISTERS

Local registers in the controller and remote registers in the drives store control or status information. Some registers, such as the word counter register 82 in FIG. 4, contain one item of information, such as the word count, so all bit positions or stages are interrelated. Other registers store diverse information in one or more groups of register stages. For example, the control and status register 80 has a stage for indicating special conditions and another stage for indicating that a transfer related error has occurred. A register in which all stages are interrelated may be arranged so either data can only be retrieved from it by the system (i.e., read-only register) or data can be retrieved from or altered in it by the system (i.e., read/write register). Registers in the former category are denoted by a cross to the right of the designation in FIGS. 8 and 9. In registers which contain independent stages, each stage may be arranged so its data either may only be retrieved (i.e., a read only stage) or may be retrieved or altered (i.e., a read/write stage). A cross above a stage indicates that it is a read-only stage.

The particular assignment of bit positions or stages made in the following discussion of local and remote registers is for purposes of explanation only. Other assignments may be made. Further, certain of the defined stages and the information they represent may be omitted and other stages representing other information may be substituted or added.

1. CONTROL AND STATUS REGISTER 80

Figure 8:
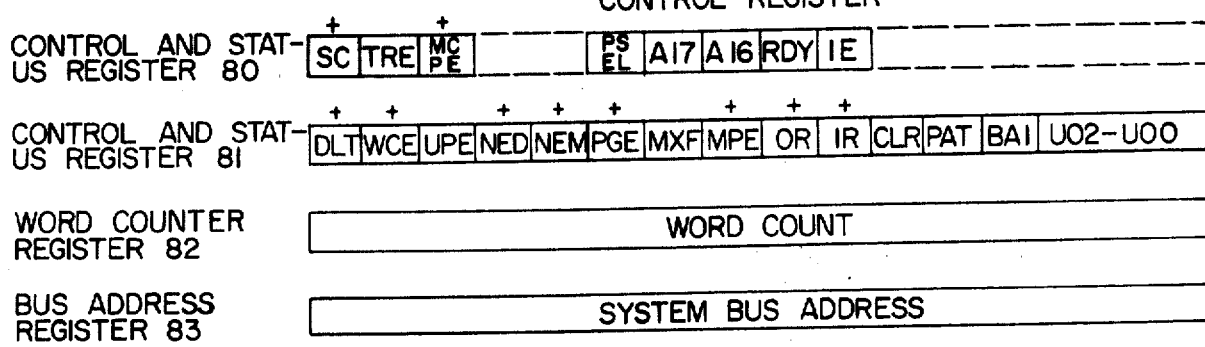
FIG. 8 depicts the organization of registers adapted for use in a controller, such as these registers shown in FIGS. 3 and 4.
Figure 10:
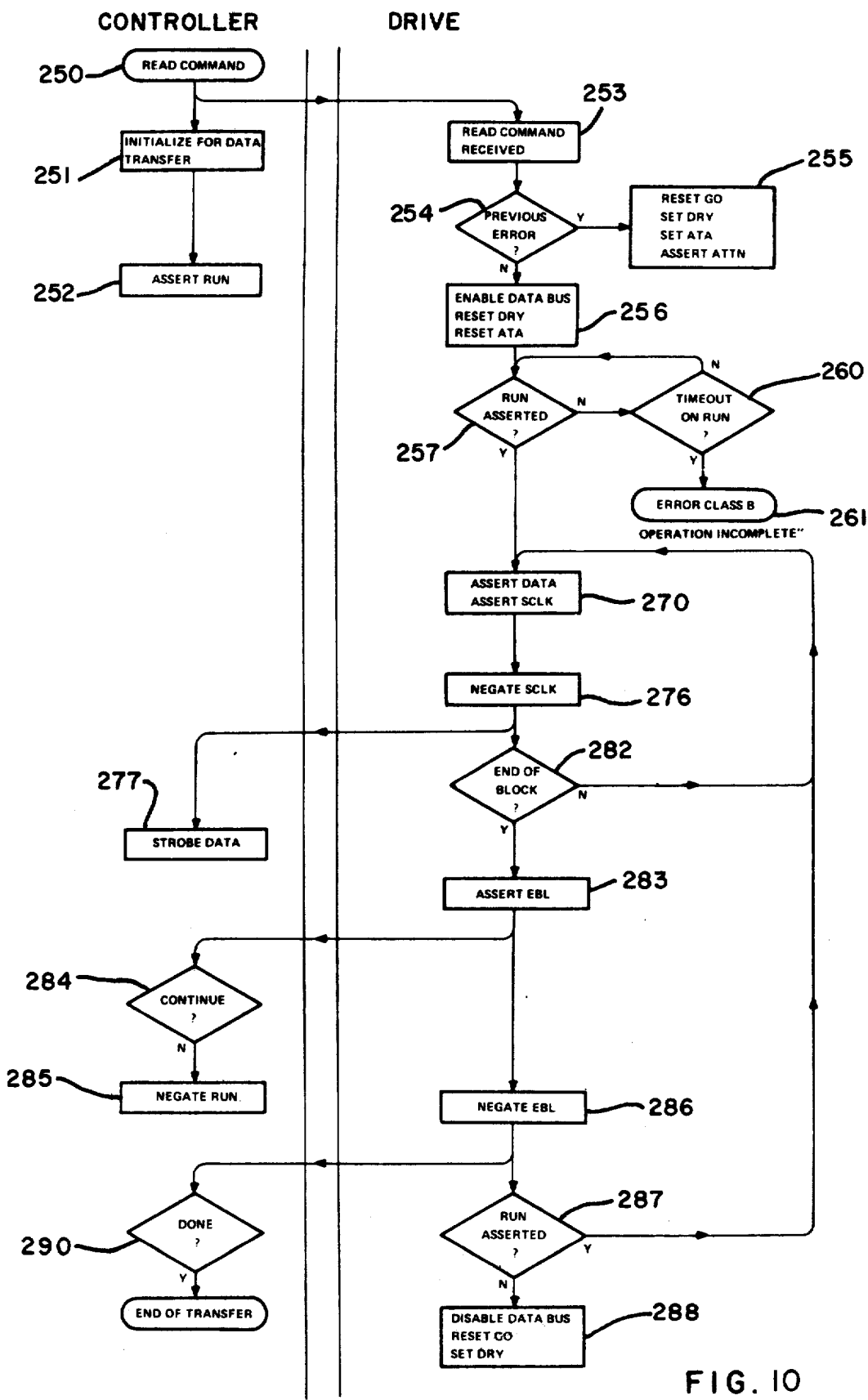
FIG. 10 is a flow chart for the operation of a controller and drive to retrieve data from the drive.

The control and status register 80 is a multi-stage or multiple bit position register. Some stages are located in the controller; others are located in each drive in what is designated the control and status register 84. The controller stages are shown in FIG. 8. One such stage is an SC stage which is set to indicate that (1) a transfer related error has occurred (i.e., a TRE bit position is set), (2) that an MCPE bit position has been set because a parity error was detected during a remote register reading operation as previously discussed, or (3) that some drive connected to the controller has produced an ATTN signal on the wire 44 in the control set 33 (FIG. 2). The controller resets the SC bit position in response to a system resetting (INIT) signal on the wire 45 in the control set 33, to a controller clearing signal which sets a CLR bit position in the control and status register 81 or in response to the correction of the condition causing the drive to assert the ATTN signal. This stage is located in the controller itself.

The TRE stage is a read/write stage in the register 80. It is set in response to the occurrence of a transfer related error signalled by certain stages in the control and status register 81 or in response to the simultaneous assertion of EXC and EBL signals on the wires 60 and 61 in the control set 54. The previously discussed INIT and CLR signals can reset the stage. In addition, the system can clear the TRE bit position by means of a local register writing operation.

As previously indicated, the controller checks the parity signal on the wire 35 in the data set 31 (FIG. 2). If a parity error is detected, the MCPE bit position is set. The MCPE stage is a read only stage. Both INIT and CLR signals cause it to be cleared. A local register writing operation may also clear this stage.

A PSEL bit position is used when the synchronous data path can be selectively coupled to either of two system buses. It is cleared when the selected system bus is also the bus which connects to the control data path. When this stage is set, data is routed to the other system bus. An INIT or CLR signal or a local register writing operation will clear the stage to thereby restore the connection between the system bus which connects to the control data path.

The control and status register 80 shown in FIG. 8 also contains A17 and A16 bit positions which are read/write stages. These positions can augment the contents of the bus address register 83 if the address is not sufficient to uniquely identify a location. Either the INIT or CLR signal or a local register writing operation can clear these two bit positions.

An RDY bit position indicates the condition of the synchronous data path in the controller and comprises a read/write register stage. It sets when power is applied and at the completion of each transfer operation over the synchronous data path. Whenever a data transfer function is received in the register 80 with the GO bit set, the RDY stage is reset.

An IE bit position is set by a local register writing operation to cause the controller to interrupt the system connected to the system bus 70 (FIG. 3) in response to the assertion of a RDY or ATTN signal. It enables other controller circuits to respond to various error conditions or to the completion of an operation to produce an interrupting signal. This bit position is reset when the system interruption circuitry recognizes the interruption or in response to an INIT or CLR signal. If a local register writing operation resets this stage, the controller can not interrupt the system and any pending interruptions are cancelled.

Several FUNCTION signals designate a specific operation the drive is to perform. They are received by the controller, although the corresponding register stages are located in the control and status register 84 in each drive. These signals define various functions which may involve a data transfer. The register stages are cleared by an INIT or CLR signal. A DRIVE CLEAR operation defined by the FUNCTION bits causes the stages to be cleared. Typical FUNCTION signals also produce the previously discussed READ, WRITE and WRITE-CHECK operations or a SEARCH operation to locate a particular area in the drive without a data transfer taking place.

When a GO bit position is set, the drive performs the operation identified by the FUNCTION bits. The INIT signal will clear the GO bit and abort any operation in response to a command. The GO bit is also cleared when an operation over the synchronous data path is completed. Setting the GO bit also can reset various error condition bit positions as discussed below.

2. CONTROL AND STATUS REGISTER 81

All stages in the control and status register 81 are located in the controller. Individual register stages reflect the operation and status of the controller, especially error conditions which might exist. A DLT bit position is one example of such a stage which is set when the controller is not able to supply or accept in a timely fashion a data word over the synchronous data path during a writing or reading operation, respectively. In a two-port operation when the PSEL stage in the system 80 is set, an INIT signal at the second system bus also sets the DLT stage if a transfer is then occuring over that second bus. Any time the DLT stage sets, the TRE stage in the register 80 is set.

A WCE bit position is set during a WRITE CHECK operation when the recorded data from the drive does not match the corresponding word in a memory location in the system. This stage sets the TRE stage in the register 80.

A UPE bit position is set during a data transfer in response to a WRITE or WRITE-CHECK command over the synchronous data path when a parity error is detected on the system bus 70. The TRE stage also sets in response to such a parity error.

An NED bit position indicates a non-existent drive and is set by the controller as described with reference to FIGS. 6 and 7. This also causes the TRE stage to be set.

If a system location specified by the controller does not exist, the controller senses an incompleted transfer operation and thereby sets an NEM bits position and the TRE stage.

When the system sends a READ, WRITE or WRITE-CHECK command while the controller is already involved in another transfer, the controller sets a PGE bit position in the register 81. This causes the TRE stage to set.

Any time a drive does not respond to a data transfer command within a predetermined time, the controller sets MXF and the TRE bit positions.

An MPE and the TRE bit positions are set if the controller detects a parity error during a transfer over the device bus in response to a READ or WRITE-CHECK command.

All the foregoing stages in the register 81 can be cleared by any one of four procedures. First, a system resetting signal clears the stages. Secondly, the system can issue a clearing command to set the CLR bit position as discussed later. Thirdly, the system can load the register 80 with the combination of FUNCTION bits which designate a data transfer operation and set the GO bit position. Finally, a word can be loaded into the register 80 which clears the TRE bit position. In addition, the UPE and MXF bit positions can be cleared directly by a local register writing operation.

OR and IR bit positions in the register 81 are used in diagnostic operations and are set when the output buffer register 74 of the input buffer register 72, respectively, in the synchronous data path are empty.

A system resetting signal, a local register writing operation to set the CLR bit, or an operation for reading the information in the respective buffers clears the OR stage or sets the IR stage.

Sometimes it is desirable to use either even or odd parity coding during a transmission over the data paths. A PAT bit position in the status register 81 can be set to produce even parity coding and decoding and reset to produce odd parity operations. A local register writing operation alters the state of the stage.

Normally the bus address register 83 is incremented or altered during each transfer to identify system locations in succession. A BAI stage in the register 81 can be set during a local register writing operation to inhibit the incrementing steps, provided the controller is not then involved in a data transfer. This condition is indicated when the RDY stage is set. Either a system resetting signal or CLR signal can clear the BAI stage.

The U02 through U00 bit positions receive their information during a local system writing operation. These stages are cleared in response to a system resetting signal or to a CLR signal. Once a transfer starts, they can be altered without interfering with the transfer.

3. WORD COUNTER REGISTER 82

The word counter register 82 initially stores the initial word count, i.e., the number of words to be involved in a data transfer. The number stored is usually the two's complement of the actual word count and the register 82, which is a counter, is incremented during each transfer of a word over the synchronous data path between the controller and the system. When the register 82 reaches ZERO (i.e., the register overflows or issues a CARRY), the requested transfer is finished. This register can only be cleared by transferring a ZERO value to it through a local register writing operation.

4. BUS ADDRESS REGISTER 83

Locations in the system from which data is retrieved or to which data is sent over the synchronous data path are identified by the bus address register 83. The A16 and A17 bit positions in the register 80 augment this information as noted above. The register 83 is a counter which is incremented in response to each data word transfer in order to identify the successive locations corresponding to the successive words involved in a transfer operation. Either a system resetting or CLR signal clears the register 83.

5. DATA REGISTER

A data register (not shown in FIG. 8) can be addressed, primarily for diagnostic purposes. There may be no physical register. Specifically, if the data register is addressed during a local register writing operation and the IR signal indicates that the storage facility 73 is not full, the information on the control data wires 34 is loaded into the input buffer 72 (FIG. 4). This condition is represented by an OBin signal. On the other hand, an OBout signal is produced when the data register is addressed during a local register reading operation and OR signal indicates that data is present. The OBout signal causes the information in the output buffer 74 to be loaded onto the system bus 70.

6. STATUS AND CONTROL REGISTER 84

Figure 9:
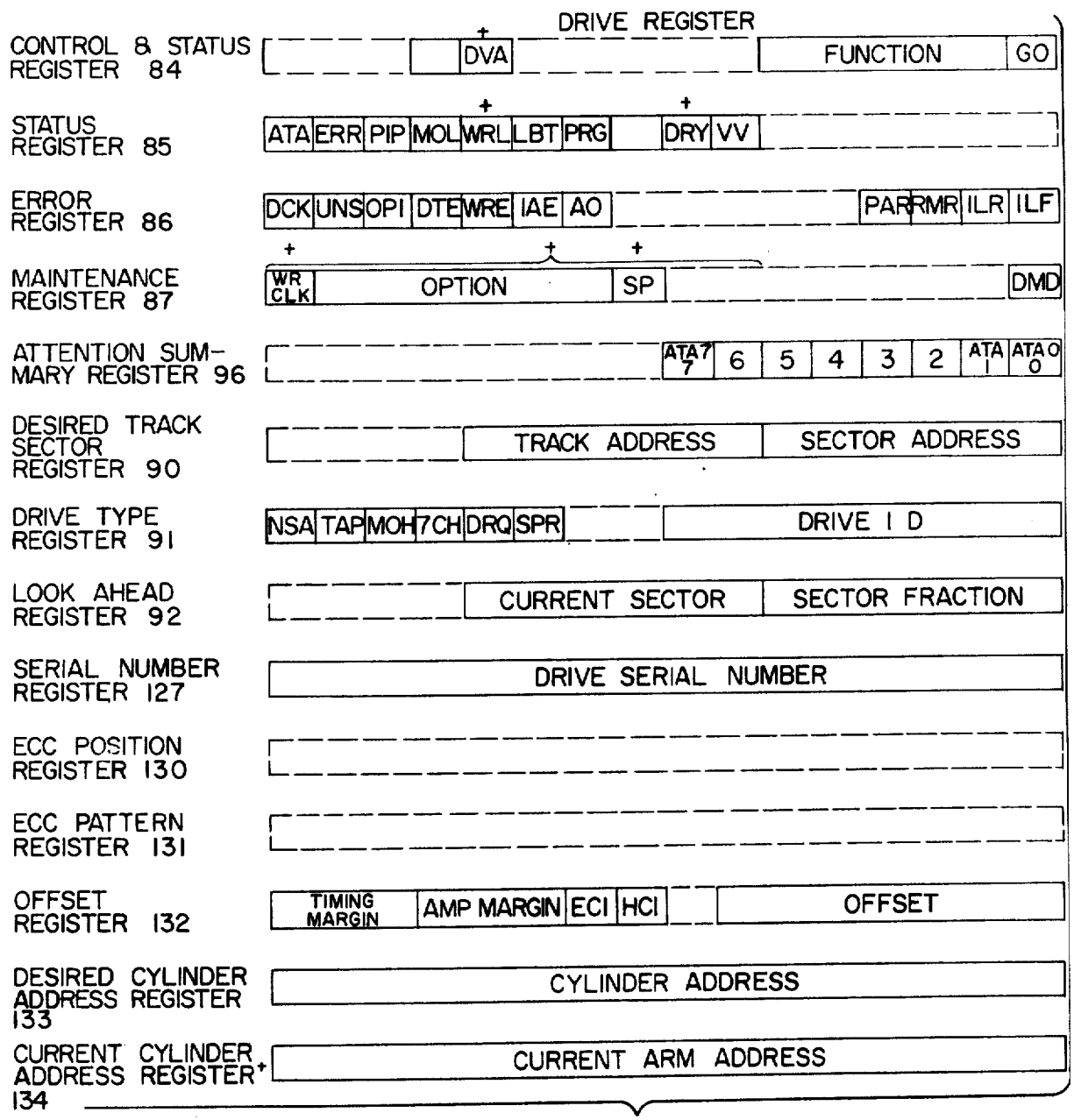
FIG. 9 depicts the organization of registers adapted for use in the drive, such as the register shown in FIG. 5.

Now referring to FIG. 9, which contains, in diagrammatic form, the organization of typical registers in a drive, the control and status register 84 stores the FUNCTION and GO bits described with respect to the control and status register 80. Whenever the register 80 is loaded, the controller produces a remote writing operation to load FUNCTION and GO bits into corresponding stages in the designated drive. A DVA stage is set whenever the drive is available for operation and is a read-only position.

7. STATUS REGISTER 85

The status register 85 reflects the status of the drive. The content of any bit position in the register 85 is dependent only upon monitoring circuits within the drive. This register 85 cannot be loaded from the controller.

Within the register 85, an ATA bit position and an ERR bit position are related. The ERR bit position is set whenever any stage in the error register 86 sets. This, in turn, sets the ATA bit position in the drive, which is also set whenever seeking and, in a moving head disk, positioning operations in response to a corresponding command are complete. A system resetting or a CLR signal will clear the ATA and ERR stages. It is also possible to clear the ATA stage by clearing the corresponding location in an attention summary register as described later or by using a local writing operation to transfer a new command to the drive which sets the GO bit position. The last two methods do not clear the error indicators themselves.

Whenever an operation in response to a SEARCH command is in progress, a PIP stage is set. Positioning operations, as apparent, are applicable only to a moving-head disk memory or equivalent units. Once the operation is completed, this stage is cleared.

Still referring to the register 85, MOL and DRY stages are set when the drive is in an operating condition; that is, the MOL stage is set when the drive power is on and, in the case of a continuous moving medium, such as a disk or drum, the medium is up to speed. The DRY stage is set to indicate that the drive can accept a command while the drive is not in an operating condition; the DRY bit position is cleared in response to a data transfer command with the GO bit position set. Any change of state of the MOL stage also causes the ATA stage in the drive to be set.

A WRL stage or switch is set to indicate tracks which are protected against writing operations. Otherwise, this stage or switch is cleared.

An LBT bit position is set during a transfer over the data set 51 (FIG. 2) to or from the highest sector (i.e., the "last" sector) on a drive. This stage can be cleared by a system resetting a CLR signal, by transferring a new address into the register 90 or by clearing the drive.

A PRG bit position is set to indicate that the drive can be controlled by either one of the controllers when the drive is connected to two controllers, as described later.

A signal from the VV bit position is useful in drives where the storage medium can be changed. Each time the MOL signal becomes active, it clears the VV bit position. The resulting inactive VV signal disables further operations. It subsequently becomes active in response to one or more specific instructions as described later. Thus, it requires the system to recognize that the medium might have been changed.

8. ERROR REGISTER 86

Now referring to the error register 86, a DCK bit position is set whenever circuitry in the drive detects an error during a reading operation over the data set 51 in response to a READ or WRITE-CHECK command.

When an UNS stage sets, the resulting UNS signal indicates an unsafe condition. For example, if the power supply voltage for the drive were to fall below a safe level, the UNS stage would set; it would be reset only when the supply voltage rises above the minimum safe level.

During a data transfer operation, circuits in the drive monitor index marks on the medium. If some number (e.g., three) of index marks pass after a data transfer command and the RUN signal is still absent, an OPI stage is set indicating a controller failure. In a disk unit, the passage of this number of index marks may signify more than one disk revolution. If a SEARCH command does not terminate within two disk revolutions, a drive failure has occurred and the OPI stage is also set.

The occurrence of any timing fault, such as the loss or addition of index or clock pulses, causes a DTE stage to set.

If the WRL bit position in the register 85 is set and a writing operation is attempted, the drive sets a WRE stage.

A remote transfer which loads a non-existent address into the desired track address register 90 causes the drive to set a IAE stage when the GO bit position in the control and status register 84 is set.

An AO bit position is set if, when the last block of the last track of a disk is read, the word counter register 82 in the controller does not indicate that the transfer is finished.

Any time a parity error is detected, either on the synchronous data path or the asynchronous control path, a PAR stage in the error register 86 sets.

If the GO signal is active, the RMR stage is set if a register writing operation designates any register except one of the attention summary registers 96 or 97 or a maintenance register 87.

Whenever the register selection (RS) signals do not identify a register in a designated drive, the drive sets an ILR stage.

FUNCTION bits which define an operation that the drive cannot perform cause an ILF bit position to be set.

The error stages are set immediately upon the condition being detected. This may result, in some cases, in an immediate interruption of the system, or in an interruption at the end of the complete transfer. In either case, the drive asserts the ATTN signal at the appropriate time to initiate the interruption. With the exception of a persistent signal from the UNS stage, signals from other stages can be cleared by a system resetting signal or CLR signal or in response to a remote register writing operation designating the register 86. In addition, a DRIVE CLEAR command code sent to the register 84 clears the corresponding stages in the designated drive.

9. MAINTENANCE REGISTER 87

The maintenance register 87 is used for various diagnostic operations to facilitate an analysis of facility operation. It may contain, for example, a WRCLK bit position or stage to aid in simulating a sector or block pulse and other similar bit positions. Usually the maintenance register also contains a DMD bit position to place the drive in the maintenance or diagnostic mode of operation when that stage is set.

10. DESIRED TRACK/SECTOR ADDRESS REGISTER 90

In the desired track/sector register 90, TRACK ADDRESS and SECTOR ADDRESS bit positions identify, respectively, the track and sector on a disk to be involved in a transfer. In a fixed-head unit, the TRACK ADDRESS bits identify a specific head. The register 90 can be incremented by successive sector signals so that successive sector and tracks can be involved in a transfer. When the last track and sector address allotted to any specific drive have been identified, the LBT stage in the status register 85 is set. The contents of the register 90 can be reset in response to system resetting or CLR signal or a DRIVE CLEAR command.

11. DRIVE TYPE REGISTER 91

The drive type register 91 contains preset values to identify the nature of the drive. It might contain, for example, an NSA bit position to indicate a drive which does not use sector addressing or a TAP bit position to indicate a tape, rather than disk, drive. An MOH bit position indicates whether a disk is a moving head disk while a 7CH bit position indicates, on a tape unit, whether the tape has seven or nine channels. A DRQ stage could indicate that a drive connects to two controllers. Sometimes a given drive might have a slave drive and an SPR bit position could indicate the presence of such a drive. DRIVE ID bit positions might identify the drive type and major variations.

12. LOOK-AHEAD REGISTER 92

The look-ahead register 92 is a counter which contains the sector address of the sector currently passing beneath the read/write heads in CURRENT SECTOR stages. SECTOR FRACTION stages are incremented periodically to identify the fractional portion of the sector which has passed the heads. This information can be used in reducing disk latency times to thereby improve disk transfer rates.

The remaining registers shown in FIG. 9 are not necessary for the operation of a fixed head disk unit such as shown in FIG. 4. They are, however, useful in the operation of other drives and may be incorporated in them.

13. SERIAL NUMBER REGISTER 127

For example, it may be desirable to include a drive serial number register 127 in magnetic tape drives or drives with removable media. The contents of the register will then identify the drive unit during regular operation or during maintenance operations. The contents might be recorded in binary-coded decimal notation.

14. ERROR CORRECTION CODE REGISTERS 130 AND 131

The function of the ECC position and the ECC pattern registers 130 and 131 shown in FIG. 9 has been discussed previously. The position and pattern are stored directly in the respective registers. They can be read through a remote register reading operation.

15. OFFSET REGISTER 132

FIG. 13 also shows an offset register 132. TIMING MARGIN and AMP MARGIN bit positions are useful in providing timing and amplitude offsets for various operations. If an ECI bit position is set and the drive has an error-correcting code function, the function is inhibited. Similarly, setting an HCI bit position inhibits header comparison circuits. OFFSET bit positions contain the actual offset value to provide a proper incremental positioning of the read/write heads over the medium.

16. DESIRED AND CURRENT-CYLINDER ADDRESS REGISTERS 133 AND 134

Two other registers useful in moving head disk memory units are a desired-cylinder-address register 133 and a current-cylinder-address register 134. The drive moves the heads to the track identified in the desired-cylinder-address register 133 and then transfers the contents of the register 133 into the current cylinder-address register 134. The register 134 then identifies the actual head position and is useful, for example, in determining the relative times necessary to move the heads from a current position to other positions.

17. ATTENTION SUMMARY REGISTERS 96 AND 97

Each of the control and interface circuits 94 and 95 in FIG. 5A in each drive contains an ATA stage as previously described. The information from a stage in register 96 can be transferred onto the data set 31 of bus 23 during a remote reading operation in which the register 96 is identified. Another ATA register 97 provides a similar function for transfers onto the bus 25. Each ATA stage in each drive is a stage in the attention summary register which has its own remote address. That is, within the register 96, for example, there is a correspondence between the position of each stage (i.e., the wire in the control data wires 34 which receives the output of the ATA stage) and a drive, each ATA stage being coupled to a unique wire when the attention summary register is read.

Whenever any stage in an error register 86 sets, its corresponding ATA stage sets. This causes the drive to issue an ATTN signal onto the common ATTN wire 44 in bus 23, or a corresponding wire in bus 25, thereby to interrupt system operations. One of the first operations in the ensuing interruption routine is the reading of the appropriate attention summary register. This reading operation is essentially the same as shown in FIG. 6. In this specific operation, however, the address circuit 101 in FIG. 4 produces RS' signals with a value of $04_8$, and the RS signals from the output drivers 124 have the same value. The controller performs steps 200 through 202 as shown in FIG. 6. After a delay, the RS signals are received by all the drives on the device bus. Now step 204 in each drive diverts to step 205. Step 205 transfers the output of the ATA stage in each drive status register 85 onto a corresponding wire in the data set 31 sometime after the DEM signal arrives. Then each drive transmits its TRA signal and the controller receives all of these after same time interval.

Several different TRA signals are received; however, the controller disables step 217 so the controller timing interval is completed. Then, in step 221, the controller branches to step 223 and reads the data thereby transferring the ATA signals from all drives to the controller. This is also the time that the controller may terminate the DEM signal as shown in step 214, so the control information is removed and the drives all terminate their respective TRA signals. Thus, when the reading operation is completed, the system "knows" exactly which drive or drives sent ATA signals and can immediately begin reading their respective error registers or other registers without any intervening polling operations.

Once all the interrupting drives have been serviced, it is necessary to reset each of the respective ATA stages. This may be done with a writing operation which is similar to that shown in FIG. 7. Step 226 loads an appropriate CTOD signal, RS signals with a value $04_8$ and the control information including a parity bit onto their respective wires in the control section 30. Then the DEM signal is loaded onto the bus (step 228). First the drive receives the control signals and then the DEM signal. Each drive may respond to the receipt of the DEM signal by transmitting a TRA signal. An ATA stage in each error register also resets in step 232 if a corresponding signal on a control data wire 34 is asserted. Again, the controller awaits for the completion of the time interval, because in step 244, the controller senses the value of the RS signals. Then the control signals and control data signals are terminated by the controller and the cycle is completed.

V. SYNCHRONOUS DATA PATH

All the foregoing transfers to local and remote registers are in the nature of "overhead" transfers which provide the necessary control and status information to effect a transfer of data between the system connected to a system bus and a drive connected to the device bus. Certain operations in response to FUNCTION bits loaded into the control and status registers 80 and 84 (FIGS. 4 and 5B) do not involve data transfers. As previously discussed, there are three basic operations which do involve such data transfers and which we designate to be "data transfer commands". They include a reading operation which transfers data from the drive into the system, in response to a READ command, a writing operation which transfers data from the system into the drive in response to a WRITE command and a write-check operation during which data stored in the drive and corresponding data in the system are compared to determine whether there were any writing errors in response to a previous WRITE command.

There are, as previously indicated, several preliminary drive control path transfers which precede the issuance of any of these data transfer commands. The starting system address must be loaded into the bus address register 83 in the controller (FIGS. 3 and 4). For purposes of this explanation, it is assumed that the A16 and A17 bit positions in the control and status register 80 (FIG. 8) are included in the register, 83 as described above. Both the word counter register 82 and the drive word counter register 116 receive a number representing the total number of words to be transferred. The address register 90 in FIG. 5B will contain sector and track addresses and a moving-head disk will contain the desired track address in the desired-cylinder-address register 133. Once this information has been received by the controller and the designated drive, the system can issue a data transfer command through a register writing operation.

A. READ COMMAND

Now referring to FIGS. 3, 4, 5A, 5B and 10, the system loads the READ command into the control and status registers 80 and 84. Thus, the FUNCTION bits now define a reading operation and the GO bit is set. This operation is represented as step 250 in FIG. 10. Step 251 represents the process of transferring the READ command into the controller and establishing various paths. In step 252 the controller issues a RUN signal on the RUN wire 57 in the control set 54.

By the time the drive receives the RUN signal, the drive has received the READ command (step 253) and determined the presence in the error register 86 of any pre-existing errors.

If any such error does exist, step 254 branches to step 255 to clear the GO bit in the drive, set the DRY bit and ATA bit and produce an ATTN signal on an appropriate ATTN wire. No further action occurs in the drive. Normally, however, there are no previous uncorrected errors. Step 254, therefore, branches to step 256, whereupon the ATA bit position, if previously set, is reset and the DRY bit position is reset unconditionally to enable the drive.

All of these operations may be completed before the drive receives the RUN signal. Steps 257 and 260 are enabled by the receipt of the command to ensure that the RUN signal is received within a predetermined interval. If it is not, the drive sets the OPI bit in the error register 86 (step 261). Again, step 257 normally branches to the remaining steps in the FIG. 10 to produce the reading operation.

Looking first at FIG. 5B, a drive control circuit 135 and a transport and medium 136 perform the actual reading operation. The drive control circuit 135 responds to the desired address in the register 90 by either selecting or positioning the appropriate reading means. A timing head in the transport and medium 136 and a timing amplifier 137 sense timing marks which a timing signal generator 140 and a sector address counter 141 convert into sector numbers. The sector addresses from the address register 90 and the counter 141 are compared in a sector address comparison circuit 142. When the desired sector identified by signals from the register 90 is reached, the comparison circuit 142 enables the drive control circuit 135 to begin retrieving data from the medium 136.

During a reading operation, the data appears serially at the input to a shift register 143 to be converted into parallel form. A CRC testing 144 unit, or other equivalent unit, may also receive these data signals to produce a cyclic redundancy check word for use as known in the art. Signals from a format counter 145 provide various timing and signal modification functions for the specific transport and medium being used in the drive. From the shift register 143, the data passes into a data buffer 146 and then is clocked onto the data wires 52 on the leading edge of a SCLK pulse on the wire 55. The data parity wire 53 receives a parity bit from a synchronous bus parity circuit 147. A bus control circuit 150 receives the RUN signal on wire 57 and may send or receive the EXC signal on wire 61.

All the conductors in the synchronous data path form a bus 50. The conductors in the bus 50 correspond to those in the data section 50 shown in FIG. 2. In FIG. 5A, the bus 50 connects to a switch circuit 251. During a synchronous data transfer, signals from the selection circuit 121 control whether switch circuit 251 connects the bus 50 to the data section 50A in bus 23 or the data section 50B in bus 25. The switch circuit 251 and circuitry for transmitting the selection signal are described in more detail later.

In the following discussion of data transfers, it is assumed that the switch circuit 251 connects the bus 50 to the bus section 50A. The drive begins transmitting data starting with step 270 in FIG. 10 on the leading edge of the first SCLK pulse. The first word of data and the parity bit then appear on the data and parity wires 52A in the section 50A for transfer over the bus 23. After both the SCLK signal and the data arrive at the controller, the SCLK pulse terminates at the drive (step 276) with the controller sensing that transition after a propogation delay. This transition causes the controller to read in the data on the data wires 52A and the data parity wire 53A during step 277 with the SCLK pulse terminating midway through the time interval that the data normally is present.

When the SCLK signal is asserted again by the drive, the next data word is transmitted onto the data wires and the cycle repeats with successive words being loaded into the controller. At the controller shown in FIG. 3, the data passes through enabled receivers 152 and the multiplexer 71 which responds to the absence of a WRITE signal to couple the receivers 152 to the input buffer 72.

As successive words are received at the input buffer 72, they pass in succession into the first-in-first-out memory, or storage facility, 73, and, under the internal timing of that memory 73, reach its output. If the EBL signal has not been received at the controller, step 282 in FIG. 10 branches back to step 270 and the next word on the medium is transferred. For each data word transfer, the drive uses a sequence comprising steps 270, 276 and 282. When the last word in each sector has been transferred, step 282 branches to step 283, and the drive transmits a fixed length (EBL) pulse onto the EBL wire 60. The controller receives the EBL signal, again after a propogation delay. If the drive word counter register 116 indicates the transfer is to continue for another block, no further action occurs in the controller. When the transfer has been completed, as indicated by an overflow of the register 116, step 284 branches to step 285 and terminates the RUN signal.

The EBL signal terminates in step 286. Termination in the absence of a RUN signal at that time causes step 287 to branch to step 288 and the transfer stops. In step 288 the drive resets the GO bit and sets the DRY bit indicating that the drive is ready to receive another command. If the RUN signal is still asserted, step 287 branches back to step 270 and the next sector is transmitted.

When the EBL signal terminates, it is sensed at the controller. If the RUN signal has been terminated, the transfer is finished and step 290 branches to complete the reading operation. Otherwise, the controller is maintained in condition to accept more data.

The EBL signal is relatively prolonged so as to ensure that when a transfer is completed, the RUN signal will terminate before the end of the EBL signal and thereby prevent the drive from cycling through an additional, unneeded block of data.

Normally the input buffer 72, the memory 73 and the output buffer 74 in FIG. 3 are constructed to store some portion of the words from one sector. As already apparent, however, a given transfer may involve more data words or fewer data words than are present in a sector. When the transfer is for fewer words, the drive word counter register 116, which is incremented in response to each data word transfer from the drive to the controller, produces an overflow which is sensed by an overflow circuit 153 before the EBL signal. However, the data words in the input buffer 72 and memory 73 advance until the first word reaches the output buffer 74, the movement into the output buffer 74 being produced by a storage, or silo, control 154. When the transfer involves more words than are present in a sector, the control 154 senses when the first word reaches the output buffer.

In either case, the presence of a data word in the output buffer causes the control 154 to activate an interruption control circuit 155 to produce an INTERRUPT signal. This signal interrupts the system (i.e., the central processing unit 10 in FIG. 1) and, in response to signals received over the system bus 70, transfers the contents of the output buffer 74 through bus receivers/drivers 156 onto the system bus 70 for storage in a location identified by the bus address register 83 shown in FIG. 4. These transfers continue until the word counter register 82 indicates that all the required transfers between the controller and the system have occurred. Then the register 82 overflows and an overflow circuit 157 disables the controls 154 and 155.

Thus, in response to a READ command, the designated controller and drive transfer the desired number of words from a sector or sectors on the medium onto the synchronous data path and then, using direct access memory procedure, to a system bus. A storage facility, such as the storage facility 73, accommodates the diverse transfer rates. Its size and operation also ensure that there is sufficient data available for efficient transfers to the system. If the system does not retrieve data quickly enough, other circuits, which are not shown, sense the arrival of data at the receivers 152 and the full input buffer 72 to set the DLT bit in the control and status register 81 as previously indicated.

B. WRITE COMMAND

During a writing operation data moves from the system over the data section 50 of a selected device bus to be stored in a designated drive. In the following discussion it is assumed that the transfer is made through the controller 13 over the device bus 23. A WRITE command from the system initiates the transfer after the word counter register 82, bus address register 83, drive word counter register 116 and other of the status and control registers are loaded, as previously indicated. Drive and controller response to WRITE command can be seen by reference to FIGS. 3, 5, 8, 9 and 11.

Initially the interruption control 155 in the controller 13 shown in FIG. 3 produces a series of INTERRUPT signals to transfer data as data words using direct memory accesses from the system bus 70 through the receiver/drivers 156 and input multiplexer 71 into the input buffer 72. As the input buffer 72 receives successive data words, the control 154 transfers them into the storage facility 73 until the storage facility 73 fills or until the word counter register 82 indicates that all data words to be transferred to the drive are in the controller. As a first data word enters the facility 73, it shifts through the storage facility 73 until the output buffer 74 receives it.

When the output buffer 74 first receives a data word, the controller may begin a transfer to the drive because the output buffer 74, the storage facility 74 and the input buffer 72 contain a plurality of storage locations. A WRITE signal, produced in response to the FUNCTION bits, enables drivers 160 to load data onto the data set 151 which includes data wires 52 and data parity wire 53. Then the actual transfer begins.

Initially, the drive and controller have received the WRITE command (step 300), and the controller prepares itself and the drive for the data transfer (step 301). Next, the controller enables the drivers 160 to load the first word of data onto the data section 51, as shown in step 302. At the same time, the control 75 transmits a RUN signal onto the RUN wire 57 as shown in step 303. The data reaches the drive over the data section 51 afer a bus transfer delay time.

Figure 11:
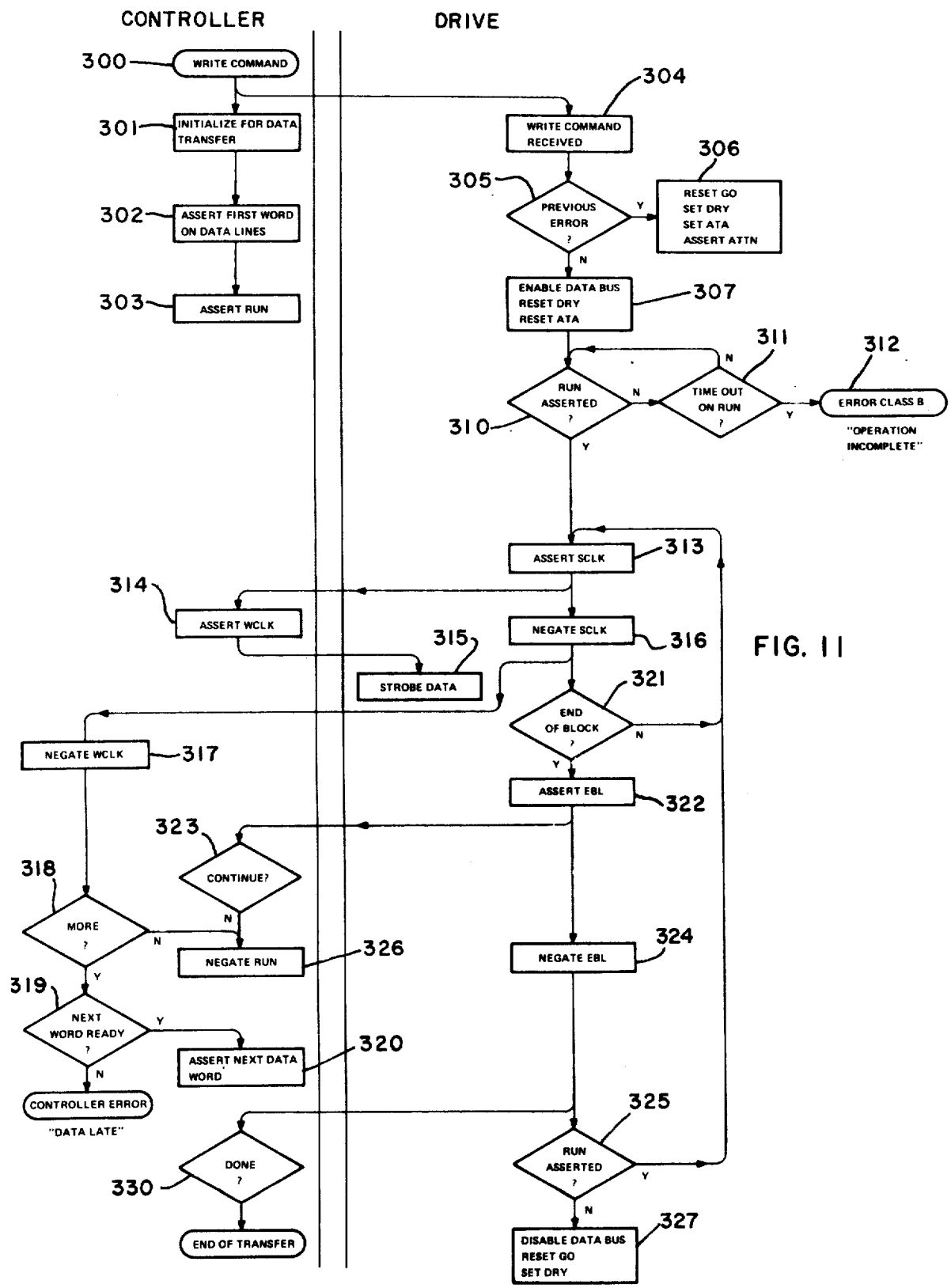
FIG. 11 is a flow chart for the operation of a controller and drive to store data in the drive.

Step 304 in FIG. 11 indicates the receipt of the WRITE command. Steps 305, 306 and 307 are analogous to steps 254, 255 and 267 in FIG. 10, and the properly condition the contents of the DRY and ATA bit positions in the status register 85, the GO bit position in the control register 84 and the signal 85, the GO bit position in the control register 84 and the signal on the ATTN wire 44. Like steps 257 and 260 in FIG. 10, steps 310 and 311 insure that the RUN signal on the wire 57 is received within a predetermined time interval to avoid a system malfunction. If a predetermined interval does expire before the RUN signal is asserted (step 312), the OPI bit position in the error register 86 sets.

Normally, however, step 310 branches to step 313 as both the data and RUN signals are received properly. Next the drive issues an SCLK pulse on wire 55 (step 313). The controller receives the SCLK signal on the wire 55 and then, at step 312, issues a WCLK signal onto the wire 56 for return to the drive. When the drive receives the WCLK signal, it stores on the medium the data from the data section 51 (step 315). Then the drive terminates the SCLK signal (step 316). This may occur before or after the receipt of the WCLK signal at the drive. The controller also stops transmitting the WCLK signal (step 317) in response to the termination of the SCLK signal. Steps 318 and 319 in FIG. 11 normally branch to step 320 whenever an additional word is in the output buffer 74 (FIG. 4). If the next word is not in the output buffer, but more words are to be transferred, step 319 branches and sets the DLT bit in the control and status register 81.

Concurrently with steps 317 through 320, the drive performs some control functions. In step 321 the control 75 monitors the drive word counter register 116. If any additional words are to be transferred to the drive, step 321 branches to step 313 and another data word can be stored. Such a cycle begins when the drive reasserts the SCLK signal on the wire 55. Subsequently, steps 313, 314, 315, 316 and 321 repeat in sequence until the last word in a block has been transferred.

When the drive receives last word in a sector or block, it transmits an EBL signal onto the wire 60 as represented in step 322. If, when controller receives the EBL signal, the word counter register 82 indicates that additional words are to be transferred from the system (step 323) the controller keeps the RUN signal active. Thus, the drive, when it terminates the EBL signal and checks the RUN signal (steps 324 and 325) cycles back to step 313.

When all words have been transferred from the system over the system bus and into the storage facility 73, step 323 branches to step 326 and the RUN signal terminates. The resulting termination is sensed on the wire 57. As previously indicated, the EBL signal is prolonged so that the RUN signal will always terminate before the EBL signal terminates. When the EBL signal at the drive terminates, a strobing signal monitors the RUN signal. As the RUN signal is not asserted, step 325 advances to step 327 to disable the synchronous data section, reset the GO bit in the drive control status register 84 and set the DRY bit in the control and status register 85. When the controller senses the transition of the EBL signal over the wire 60, it terminates, in steps 330, its writing operation.

It is possible that during the transfer operations, the controller will not be prepared to transfer a word through the drivers 160. When this occurs step 319 in FIG. 11 branches and the controller set a DLT bit position in the control and status register 81.

C. WRITE-CHECK COMMAND

During an operation initiated by a WRITE-CHECK command, circuits in the controller compare the data actually written in a drive with the data contained in the system. This command produces a reading operation over the device bus connected to the controller (i.e., the device bus 23 in FIG. 3) and the data words pass through the input buffer 72, storage facility 73, and output buffer 74. The control 75 also responds to the WRITE-CHECK command by enabling an EXCLUSIVE OR circuit array 161 to receive the data in the output buffer 74 as one input.

When the output buffer 74 contains a word, the interruption circuit 155 generates an INTERRUPT signal to effect a data transfer from locations identified by the contents of the bus address register 83 over the system bus 70 through the receivers/drivers circuit 156 to be a second input to the EXCLUSIVE OR array 161. If any error exists, then the EXCLUSIVE OR array 161 produces a ONE output which a WRITE-CHECK ERROR circuit 162 monitors. The control circuit 75 may then interrupt subsequent operations.

Otherwise the operation is the same as a READ operation in response to a READ command. Successive words from the drive are transferred over the device bus 23. Corresponding words from the system identified by the bus address register 83 are received over the system bus 70 and through the receivers/drivers circuit 156 as in a writing operation except they pass directly to the EXCLUSIVE OR array. The word counter register 82 and drive word counter register 116 will terminate the operations and effectively disconnect the controller and the drive as previously discussed.

VI. Detailed Description of Drive

FIGS. 12A through 12D show, in detail, the control and interface circuits 94 and 95, the priority arbitration circuit 120, the selection circuit 121 and switch circuit 122 shown in FIG. 5A. Where the detailed logic diagrams in FIGS. 12A through 12D comprise duplicate sections, only one section is shown in detail. These sections are bounded by dashed lines and identified by reference numerals with the suffix A. The duplicate sections are shown as block diagrams using the same reference numerals with a suffix B.

The switch circuit 251 in the synchronous data path in FIG. 5A receives selection signals from the selection circuit 121. These signals include a PORT B ON signal, an SYNC REC EN-A signal, an SYNC REC EN-B signal, an SYNC XMIT EN-A signal and an SYNC XMIT EN-B signal. One set of switches in the switch circuit 251 routes synchronous path signals (in the data and control sets 51 and 54 of FIG. 2) to each of the data sections 50A and 50B, respectively. This switch set responds to the PORT B ON signal. Data receivers and drivers connect to each of the data sets (51 in FIG. 2) in the data sections 50A and 50B. Receivers connected to the data wires in the data sections 50A and 50B are enabled, respectively, by the SYNC REC EN-A and SYNC REC EN-B signal. The SYNC XMIT EN-A signal from the selection circuit 121 enables drivers to transfer data from the data set 51 in the data section 50 onto the data section 50A. Likewise, the SYNC SMIT EN-B signal enables a transfer of data from the drive through the drivers onto the data section 50B. Whenever the SYNC XMIT EN-A signal or SYNC XMIT EN-B signal is active, the corresponding one of the SYNC REC EN-A or SYNC REC EN-B signals is also active. This enables data from the drive, placed on the data section 50B, to be fed back into the drive for various testing purposes. The transmission of each of these receiver and driver enabling signals for the switch circuit 251 is discussed in more detail with respect to FIGS. 12A through 12D.

Figure 12A:
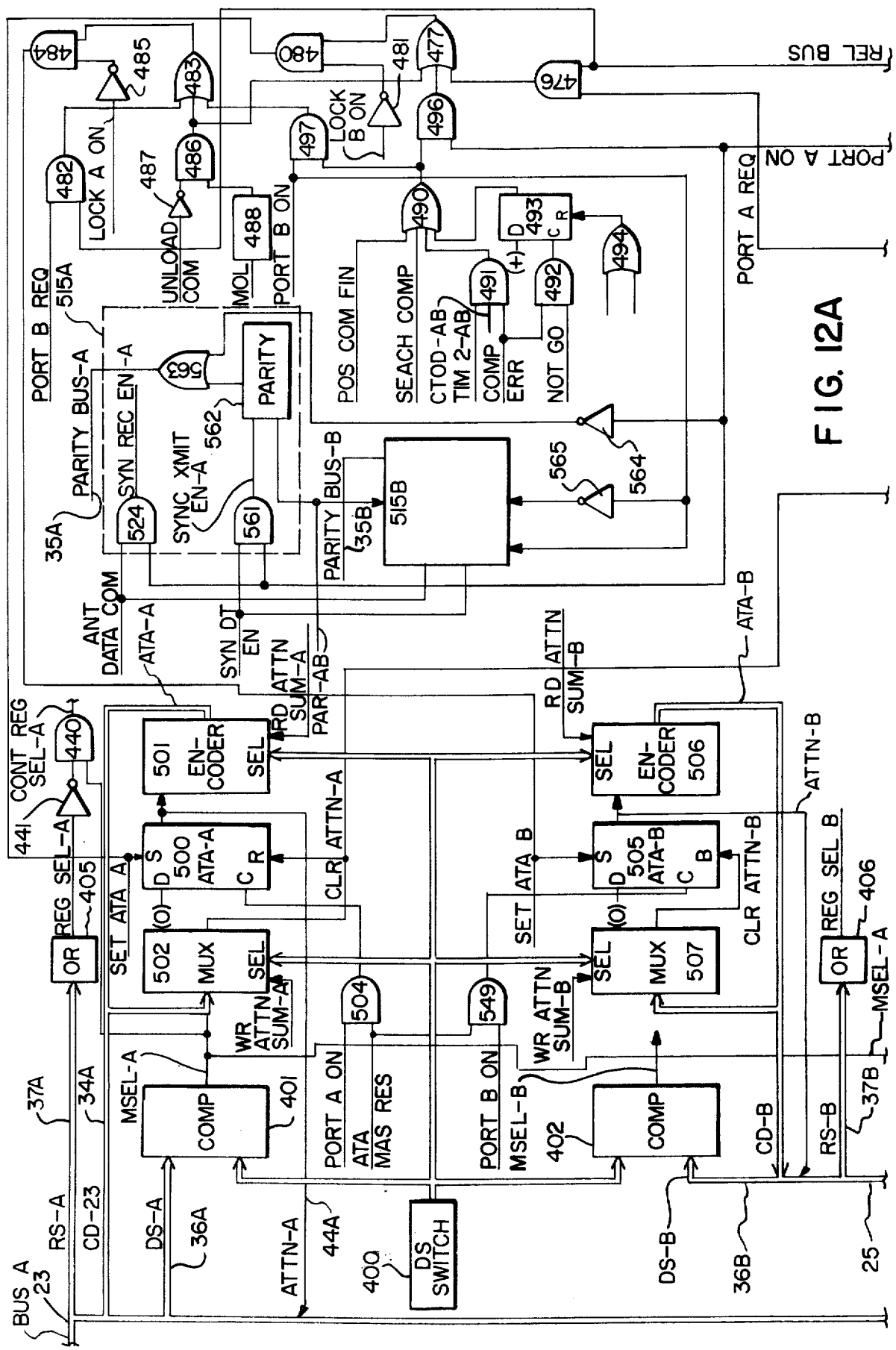
FIGS. 12A, 12B, 12C and 12D together constitute a detailed circuit diagram of priority arbitration and controller selection circuits adapted to be included in the drive shown in FIGS. 5A and 5B.

It is helpful in understanding this invention to consider the operation of certain portions of FIGS. 12A through 12D making the assumption that the switch circuits 122 and 251 are actuated to route signals between the drive and the controller 13 connected to the device bus 23 (FIGS. 1 and 5A). During a remote register reading operation, the incoming control and address signals are coupled over the control section 30A from the controller to the control and interface circuit 94, shown in FIG. 5A, and are received by circuits shown in FIGS. 12A and 12B. Referring to FIG. 12A, DS-A and RS-A address signals identify the drive and register within the drive, respectively, and appear on wires 36A and 37A. The CTOD-A and DEM-A signals appear on conductors 40A and 41A respectively, shown in FIG. 12B. Control information from an identified register is routed from the drive over the device bus 23 and through the controller 13 in FIGS. 1 and 5A during a remote reading operation, and it appears on the CD-A wires 34A in FIG. 12A. The TRA-A signal is transmitted onto a conductor 42A in FIG. 12B while the ATTN-A signal appears on conductor 44A shown in FIG. 12A.

Still referring to FIG. 12A, the DS-A signals are compared with DS SWITCH signals from a DS SWITCH circuit 400 in a comparator (COMP) 401. The DS SWITCH signals uniquely identify a drive with respect to other drives connected to the same controller. As apparent, these signals in a system incorporating this invention identify the drive with respect to each of two controllers. Normally, the DS SWITCH circuit 400 provides DS SWITCH signals to the comparator 401 and another comparator 402 which receives the DS-B signals on the DS-B wires 36B from the device bus 25. Alternatively, a second DS SWITCH circuit could apply a different set of DS SWITCH signals to the comparator 402.

Figure 12B:
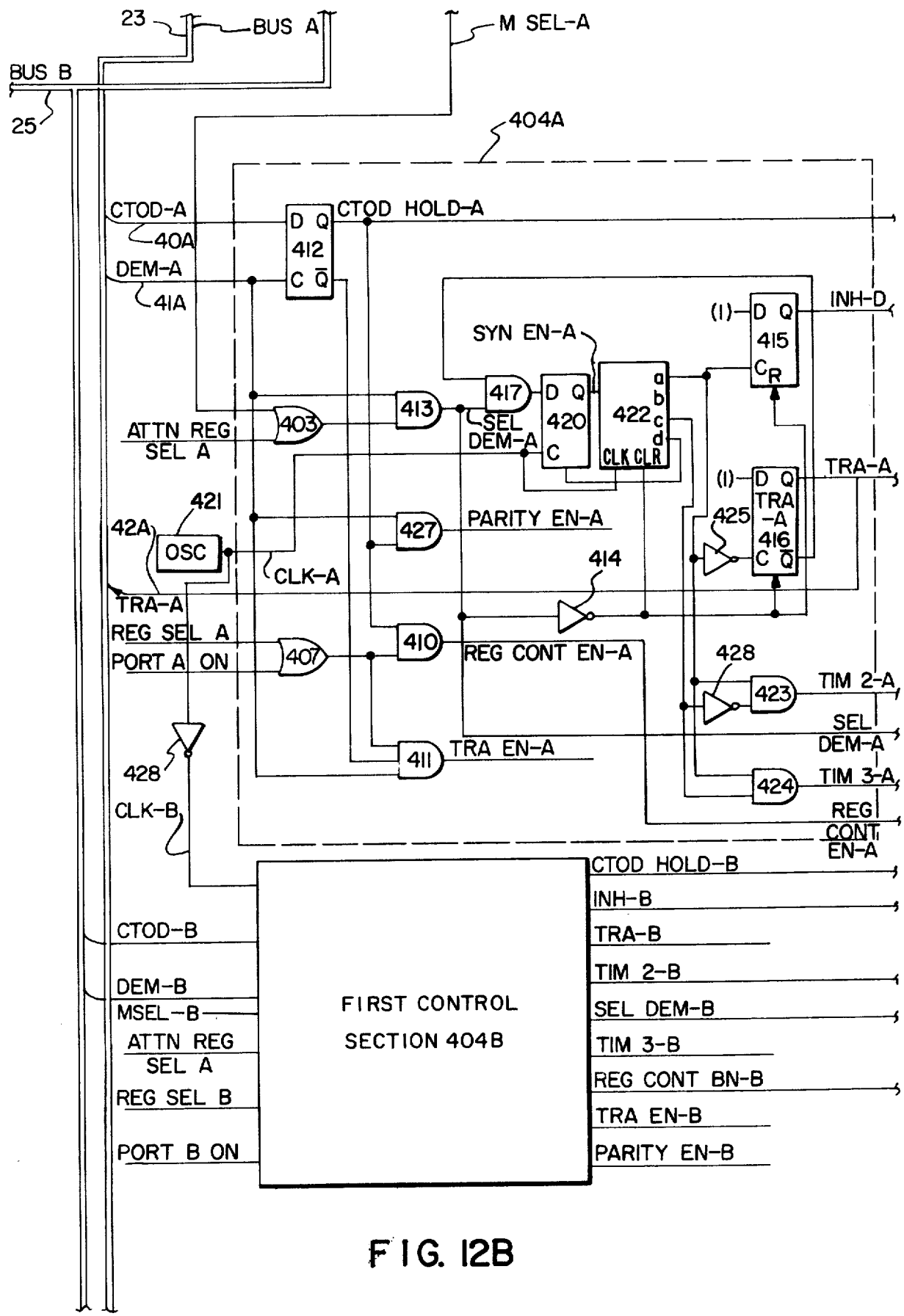

Whenever the comparator 401 receives DS-A signals identifying its drive, it transmits an MSEL-A signal indicating that the drive is to decode the RS-A register address signals on wires 37A and to receive the respond to other control signals which subsequently appear on the control set 33A. The MSEL-A signal passes through an OR gate 403 in FIG. 12B which is included in a first control section 404A. This control section, bounded by a dashed line in FIG. 12B, is normally part of the control and interface circuit 94 in FIG. 5A. The MSEL-B signal which the comparator 402 in FIG. 12A transmits is applied to a first control section 404B in FIG. 12B, normally part of the control and interface circuit 95 (FIG. 5A).

Referring again to FIG. 12A, the RS-A signals on conductors 37A also energize an OR gate 405 which transmits an REG SEL-A signal any time any register, other than the control and status register 84, is designated. Likewise, an OR gate 406 transmits an REG SEL-B signal any time RS-B signals on conductors 37B identify a register other than control and status register 84.

When the controller 13 in FIG. 1 is effecting a register reading or writing operation, the CTOD signal state indicates the nature of the transfer. During a writing operation, the CTOD signal becoms active simultaneously with the RS and CD signals and appears as a CTOD-A signal on wire 40A in FIG. 12B. However, the circuit does not respond to the CTOD-A signal until the DEM-A signal on wire 41A becomes active.

Assuming that the drive is operating with the controller 13 in FIG. 1, a PORT A ON signal is active. Thus, an OR gate 407 is energized and enables AND gates 410 and 411 before the DEM-A signal becomes active.

When the DEM-A signal appears on the wire 41A, a flip-flop 412 is set or reset, depending upon the CTOD A signal on wire 40A. Specifically, the flip-flop 412 sets during a remote register writing operation. In that case, the AND gate 410 transmits a REG CONT EN-A signal. This signal enables the register identified by the RS-A signals to receive and store the incoming data. During a remote register reading operation, however, the flip-flop 412 is reset so the AND gate 411 transmits a TRA EN-A coincidentally with the DEM-A signal. The TRA EN-A signal enables drivers in the control and interface circuit 94 of FIG. 5A to transfer data from the register identified by the RS-A signals through the switch circuit 122 and circuit 94 onto the device bus 23.

The DEM-A signal on wire 41A also energizes an AND gate 413 which the MSEL-A signal enables through the OR gate 403. An SEL DEM-A signal from the AND gate 413 enables a synchronizing operation to begin. Prior to the assertion of the SEL DEM A signal, an inverter 414 provided an overriding resetting signal to flip-flops 415 and 416. The flip-flop 416, while reset, enables an AND gate 417. When the SEL DEM-A signal becomes active, it conditions a flip-flop 420 to be set upon receipt of a CLK-A signal from an oscillator 421. At the same time, the inverter 414 removes the overriding resetting signal from the flip-flops 415 and 416 so they can be set in response to appropriate clocking signals from a counter 422. The SEL DEM-A signal also enables an AND gate 423 and another AND gate 424 which transmit respectively timing signals TIM 2-A and TIM 3-A, respectively, in accordance with other signals received from the counter 422.

The frequency of the oscillator 421 is much greater than maximum rate at which the controllers can initiate remote register transfer operations. The first leading edge of a CLK-A pulse to the flip-flop 420 after the AND gate 417 is energized clocks the flip-flop 420 to a set condition. This produces a synchronizing SYN EN-A signal which also is an input to the counter 422. Counter 422 is a "ring-tail" or "Johnson-type" counter which comprises a series of shift registers and feedback circuits. Successive CLK-A pulses shift ONE's through the counter and then ZERO's through the counter 422.

As shown in FIGS. 12B and 13, the oscillator 421 is a free running oscillator and continuously transmits CLK-A pulses (Graph 13A). When the SEL DEM-A signal, which is an asynchronous signal with respect to the oscillator 421 from the AND gate 413, shifts to an active state (Graph 13B), it defines the start of a transfer interval, and the AND gate 417 immediately conditions the flip-flop 420 to be set (Graph 13C) to produce an SYN EN-A signal which is in synchronism with the clock pulses from the oscillator 421. Thus, the next leading edge of a CLK-A pulse sets the flip-flop 420 (Graph 13D) and initiates an interval timing sequnce defined by the next seven CLK-A pulses. The first four CLK-A pulses shift ONE's through the counter 422 (Graphs 13E through 13H). On the first of the four CLK-A pulses, the counter 422 clocks and sets the flip-flop 415 by asserting the output 422a. The flip-flop 415 transmits an INH-A signal. Normally the PORT A ON signal is active by this time. If it is not, there may not be sufficient time for the various circuits to settle or for all the necessary operations to be completed properly. As shown later, if the PORT A ON signal is not active when the INH-A signal becomes active during this interval, the PORT A ON signal will not become active. The remaining operation then proceeds as if the drive were operating in response to signals from the other controller (i.e., controller 16 in FIG. 1).

While the signal from the output 422a is active and the output 422c is inactive, an inverter 428 and the AND gate 423 transmit a TIM 2-A pulse to define a corresponding timing interval. The second and third of the four CLK-A clock pulses activate the outputs 422b and 422c in succession. When the outputs 422c becomes active (Graph 13G), the TIM 2-A pulse terminates. However, the AND gate 424 is simultaneously energized and begins to transmit a TIM 3-A pulse. The forth CLK-A pulse activates the output 422d and thereby resets the flip-flop 420 to terminate the SYN EN-A signal (Graphs 13H and 13D).

The next four CLK-A pulses therefore shift ZERO's through the counter 422. Thus, the first in this second set of CLK-A pulses shifts the output 422a to a nonassertive position level (Graph 13E). This terminates the TIM 3-A pulse (Graph 13L). An inverter 425 simultaneously clocks and sets the flip-flop 416 so the drive transmits the TRA-A signal onto conductor 42A (Graph 13J). This also disables the AND gate 417 (Graph 13C).

At some time after the flip-flop 416 sets and transmits the TRA-A signal, the controller terminates the DEM-A signal. Then the SEL DEM-A signal from the AND gate 413 terminates and the inverter 414 immediately resets the flip-flops 415 and 416 to terminate the INH-A and TRA-A signals (Graphs 13I and 13J.

Still referring to FIG. 12B, the first control section 404A contains an AND gate 427 which flip-flop 412 enables during a writing operation. This AND gate 427 transmits a PARITY EN-A signal for the duration of the DEM-A signal on the conductor 41A, to enable a parity bit to be received from the parity wire 35A and monitored in the asynchronous parity circuit 126 shown in FIG. 5B.

The first and second control sections 404A and 404B in FIG. 12B contain analogous circuitry and are located, respectively, in the control and interface circuits 94 and 95 in FIG. 5A. Thus, each section receives and transmits signals in response to signals received over the control sections 30A and 30B. As described more fully later, the two sections 404A and 40 4B do not respond in synchronism, however. An inverter 428 receives the CLK-A pulses from the oscillator 421 and transmits CLK-B pulses. Thus, the CLK-A and CLK-B pulses are 180° out of phase with each other.

Figure 12C:
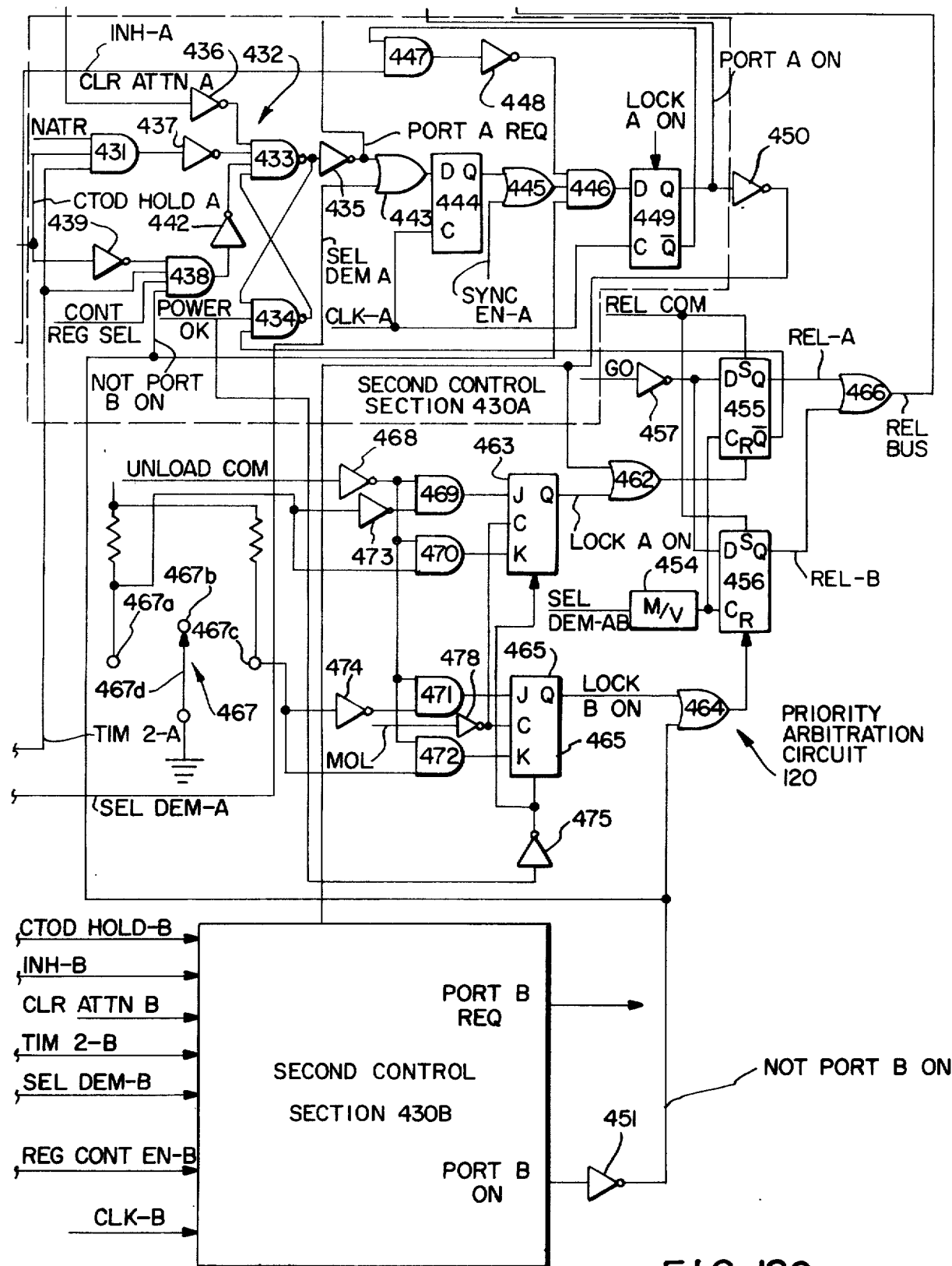

Referring to FIG. 12C, a second control section 430A receives the output signals from the first control section 404A in FIG. 12B and from other circuitry shown in FIGS. 12A through 12D. This second control section 430A coacts with a second control section 430B and the priority arbitration circuit 120 shown in FIGS. 5A and 12C to transmit PORT A ON and PORT B ON signals.

Referring specifically to the section 430A in FIG. 12C, and AND gate 431 receives the CTOD HOLD-A signal from the flip-flop 412 in FIG. 12B and an NATR signal which is active whenever the RS-A signals on conductors 37A in FIG. 12B identify a register other than the attention summary register 96 (FIG. 5A). The AND gate 431 thereby is enabled during a writing operation to any register other than the attention summary register. When enabled, the AND gate 431 passes a TIM 2-A pulse to set a latch circuit 432 which then transmits a PORT A REQ signal.

Specifically, the latch circuit 432 comprises cross-coupled NAND gates 433 and 434 and an inverter 435 coupled to the output of the NAND gate 433. A POWER OK signal when inactive, keeps the latch 432 reset so the inverter 435 can not transmit the PORT A REQ signal. When it is active, the latch 432 can set and transmit the PORT A REQ signal in response to any one of three operations:

1. during remote register writing operation to the attention summary register which clears the ATTN signal, an inverter 436 disables the NAND gate 433 and sets the latch 432;
2. during a remote register writing operation to some register other than the attention summary register 96, the AND gate 431 and an inverter 437 set the latch 432; and
3. during a reading operation when the RS-A signals identify the control and status register 84, an AND gate 438 receives a NOT PORT B ON signal indicating that the unit is not connected to the device bus 25 in FIG. 5A. An inverter 439 provides a second enabling signal whenever the flip-flop 412 in FIG. 12B is reset. A CONT REG SEL signal indicates that the RS-A signals identify the control and status register 84. This signal is obtained from an AND gate 440 and inverter 441 shown in FIG. 12A and is active whenever the RS-A signals have a value $00_8$. The TIM 2-A pulse energizes the AND gate 438 and the output from an inverter 442 sets the latch 432.

The outputs of each of the inverters 436, 437 and 442 are negative-going pulses. The latch 432 sets on the leading edge of any one of these pulses. After the trailing edge, the latch 432 can be reset in response either to a loss of the POWER OK signal or to transmission of a REL-A signal as described more fully later. If the second section 430A is transmitting a PORT A ON signal, no additional action is taken within this section.

If, on the other hand, the drive is free to transfer between control and the device buses 23 and 25 in FIG. 5A, an OR gate 443 conditions a flip-flop 444 to be set by the leading edge of the next CLK-A pulse from the oscillator 421 in FIG. 12B. When the drive is not previously connected and has responded to all previous requests, the SEL DEM-A signal from the AND gate 413 in FIG. 12B also conditions the flip-flop 444 through the OR gate 443.

An OR gate 445 receives the output signal from the flip-flop 444 and the SYN EN-A signal from the flip-flop 420 in FIG. 12B. The OR gate 445 performs a synchronizing function in the case where the PORT A REQ signal is inactive. When the SEL DEM-A signal becomes active, it conditions both the flip-flop 420 in FIG. 12B and the flip-flop 444 in FIG. 12C simultaneously. If this shift of the SEL DEM-A signal, which is asynchronous with respect to the oscillator 421, occurs in time near the clocking transition of a CLK-A pulse, one or both of the flip-flops might be or might not be set due to the internal circuit designs and variances of these flip-flops. Referring to FIG. 12C, the OR gate 445, by responding to either one, assures that the AND gate 446 is properly conditioned at the earliest time.

If the PORT A ON signal is inactive and the flip-flop 415 in FIG. 12B is not set, and AND gate 447 in FIG. 12C and inverter 448 condition a flip-flop 449 so the next CLK-A pulse sets it. Then the flip-flop 449 transmits the PORT A ON signal. An inverter 450 transmits a NOT PORT A ON signal. A similar sequence occurs if the latch 432 is set when the PORT B ON signal becomes inactive. In that case, the next CLK-A pulses set the flip-flops 444 and 449 in succession to effect the transfer of control to the controller 13 in FIG. 1.

As previously indicated, the INH-A signal becomes active to define the latest time the PORT A ON signal can become active. If the PORT A ON signal becomes active before the INH-A signal, it disables the AND gate 447 so the AND gate 446 remains enabled. On the other hand, if the PORT A ON signal is not active, the INH-A signal energizes the AND gate 447. Thus, the inverter 448 disables the AND gate 446 so a succeeding CLK-A pulse can not set the flip-flop 449.

As previously indicated, the section 430B contains circuitry analogous to that shown within the dashed lines of the second control section 430A. Thus, the section 430B produces a PORT B REQ signal and a PORT B ON signal. An inverter 451 receives the PORT B ON signal and transits the NOT PORT B ON signal to the AND gates 438 and 446. The PORT B ON signal from the section 430B is one of the selection signals which passes from the selection circuit 121 in FIG. 5A to the switch circuit 251 as previously discussed. Therefore, the switch circuit 251 connnects the drive to device bus 23 unless the PORT B ON signal is active.

The control section responds to the CLK-B pulses from the inverter 428 shown in FIG. 12B. Thus, it is not possible for both the flip-flop 449 and the corresponding flip-flop in the section 430B to set simultaneously even if the OR gate 443 and corresponding OR gate in the sector 430B are energized simultaneously. Further, the propogation times are not a factor so the assertion of the PORT B ON signal on a leading edge of the CLK-B pulse will be reflected at the input to the flip-flop 449 before the leading edge of the CLK-A pulse, which is coincident with the trailing edge of the CLK-B pulse.

Once section 430A transmits the PORT A ON signal, successive CLK-A pulses continue to keep the flip-flop 449 in FIG. 12C set until some predetermined interval elapses without any transfer of data or until a release command is received.

Figure 12D:
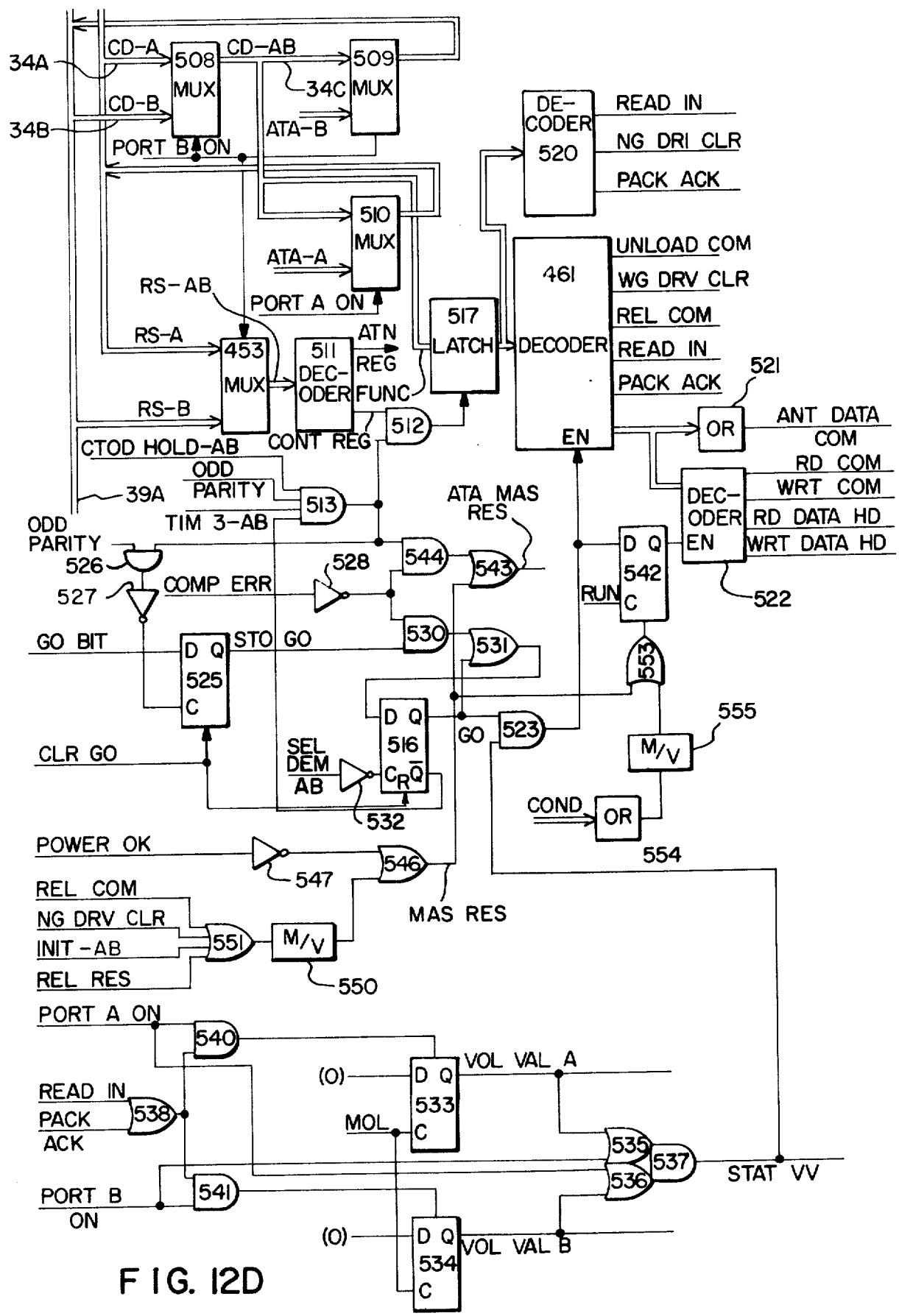

Now referring to FIG. 12D, the switching cicuit 122 in FIG. 5A includes a multiplexer (MUX) 453. In the drawings each output has suffix AB affixed to certain signal mneomonics. This indicates that the signal comes from the output of the multiplexer 453 based on the status of the PORT B ON signal. Thus, when the PORT B ON signal is active, the RS-AB signals correspond to the RS-B signals; when the PORT B On signal is inactive, the RS-AB signals correspond to the RS-A signals. To simplify the drawing, only RS-A and RS-B input signals and RS-AB output signals are specifically shown. MSEL-A and MSEL-B signals from the comparators 401 and 402 in FIG. 12A are also two inputs to the multiplexer 453. The corresponding output is an MSEL-AB signal.

Each time a DEM-A signal appears on conductor 41A in FIG. 12B, the resulting SEL DEM-AB signal from the multiplexer 453 is applied to a re-triggerable one-shot multivibrator 454 in FIG. 12C. The multivibrator 454 has a long time interval which exceeds the interval between successive SEL DEM-A pulses. As apparent, the multiplexer 453 in FIG. 12D does not pass any SEL DEM-B signals while the PORT A On signal is active. Thus, so long as remote register reading or writing oerations occur at intervals which are less than the timing interval of the multivibrator 454, the multivibrator 454 remains active. If the multivibrator 454 does shift states at the end of its interval, it clocks flip-flops 455 and 456 to a set condition if a GO signal is inactive. The GO signal is coupled to the flip-flops 455 and 456 through an inverter 457. Thus, the multivibrator 454 prevents the drive from becoming coupled to one of the drive buses for an inordinate time during normal operations by simulating a RELEASE BUS command.

Circuitry described later with reference to FIG. 12D transmits the GO signal, but at this stage it is sufficient to consider that the GO signal is active whenever the control and status register 84 contains a command in which the GO bit position contains a ONE. The flip-flops 455 and 456 also set in response to the receipt by the drive of the FUNCTION bits designating a release bus command. Upon receipt of such a command, a decoder 461 in FIG. 12D transmits an REL COM signal which serves as an overriding setting signal to both the flip-flops 455 and 456 in FIG. 12C. When the second control section 430A does not transmit a PORT A ON signal, the inverter 450 applies an overriding resettng signal to the flip-flop 455 through an OR gate 462 which is also energized by a flip-flop 463 when it is set to transmit a LOCK A ON signal. Likewise, an OR gate 464 supplies an overriding resetting signal to flip-flop 456 whenever the NOT PORT B ON signal is acitve or whenever a flip-flop 465 is set thereby transmitting a LOCK B ON signal. Whenever the flip-flop 455 or the flip-flop 456 sets, an OR gate 466 transmits an REL BUS signal, described later.

Before describing the operation of the REL BUS signal, it will be helpful to understand how the flip-flops 463 and 465 in FIG. 12C transmit LOCK A ON and LOCK B ON signals, respectively. A three-position, single-pole switch 467 is shown in FIG. 12C with a wiper arm 467d grounding a contact 467b. If the switch 467 were rotated to ground contact 467a, the flip-flop 463 would set through a network of inverters and gates including an inverter 468 which enables an AND gate 469 and an AND gate 470, except when the control and status register 84 contains an UNLOAD command. The decoder 461 in FIG. 12D generates the UNLOAD COM signal. Normally the inverter 468 in FIG. 12C also enables AND gates 471 and 472. When the switch grounds contact 467a, it energizes the AND gate 469 through an inverter 473 and it disables the AND gate 470. This conditions the flip-flop 463 to be set whenever the MOL signal becomes active, an inverter 478 actually clocking the flip-flop 463 so it transmits the LOCK A ON signal. Likewise, grounding contact 467c energizes the AND gate 471 through an inverter 474 and disables the AND gate 472 so the flip-flop 465 sets when the MOL signal becomes active to transmit LOCK B ON signal. With this circuitry, the switch 467 can be moved while the drive is operating, but without any effect. Both the flip-flops 463 and 465 are immediately reset by an inverter 475 whenever the POWER OK signal becomes inactive.

With this understandng of the conditions which cause the OR gate 466 to transmit the REL BUS signal, in FIG. 12C, reference can be made to an AND gate 476 and related circuitry in FIG. 12A. If the latch 432 in FIG. 12C is transmitting a PORT A REQ signal while the OR gate 466 in FIG. 12C transmits an REL BUS signal, the AND gate 476 energizes an OR gate 477, which, in turn, energizes an AND gate 480 if the LOCK B On signal is inactive. An inverter 481 receives the LOCK B ON signal. Under these conditions, the AND gate 480 transmits a SET ATA-A signal. Likewise, the REL BUS signal energizes an AND gate 482 if the PORT B REQ signal is active. When the AND gate 482 is energized, an OR gate 483 and AND gate 484 transmit the SET ATA-B unless the flip-flop 463 in FIG. 12C transmits a LOCK A ON signal. An inverter 485 disables the AND gate 484 whenever the LOCK A ON signal is active.

Thus, an REL BUS signal causes the drive to issue a SET ATA-A signal in response to a pending port request from controller 13 if the drive is not then locked to device bus 25 by the switch 467. Similarly, the AND gate 484 transmits the SET ATA-B signal if a PORT B REQ signal is active when the REL BUS signal is transmitted provided the drive is not locked to operate with the device bus 23.

Still referring to FIG. 12A, both the AND gates 480 and 484 transmit SET ATA-A and SET ATA-B signals simultaneously when the MOL signal changes state unless the change occurs while the decoder 461 in FIG. 12D is transmitting an UNLOAD COM signal. Such a signal initiates operations which take the drive off line so a change in the MOL signal state is expected. An inverter 487 enables the AND gate 486 whenever the UNLOAD COM signal is inactive. A pulse generator 488 transmits an energizing pulse in response to any transition of the MOL signal and the output of the AND gate 486 is coupled through both the OR gates 477 and 483.

Other conditions which cause the ATA signals to be transmitted are limited to the attention summary registers associated with the controller then connected to the unit. Specifically, an OR gate 490, shown in FIG. 12A, is energized in response to any one of a number of conditions. A POS COM FIN signal is transmitted by circuitry (not shown) which indicates, in a moving head disk, that a positioning operation, initiated in response to a positioning command being transferred into the control and status register 84, has been completed. A SEARCH COMP signal similarly energizes the OR gate 490 when a searching operation is complete. The AND gate 491 is energized during a writing operation (i.e., the CTOD-AB signal is active) in response to a TIM 2-AB signal when any one of several error conditions cause other circuitry (not shown) to transmit a COMP ERR signal. The TIM 2-AB signal is received from the multiplexer 453 shown in FIG. 12D. The COMP ERR signal also enables AND gate 492 in FIG. 12A to receive a NOT GO signal, for example, from the inverter 457 in FIG. 12C, to clock a flip-flop 493 to a set condition upon completion of the transfer. The receipt of either an ATA-AB signal from the multiplexer 453 in FIG. 12D or a master resetting (MAS RES) signal (described later), energizes an OR gate 494 to reset the flip-flop 493.

Whenever any of these or other conditions occur, the OR gate 490 energizes an AND gate 496 or 497 depending on the state of the PORT A ON and PORT B ON signals. If the PORT A ON signal is active, the AND gate 496 energizes the OR gate 477 to produce the SET ATA-A signal. If the PORT B ON signal is active, the OR gate 490 energizes the AND gate 497 and the OR gate 483 to produce the SET ATA-B signal.

Still referring to FIG. 12A, the SET ATA-Am signal from the AND gate 480 immediately sets an ATA-A register stage 500 constituted by a triggered flip-flop. When set, the ATA-A stage 500 transmits the ATTN signal onto the wire 44A for transmission back to the controller 13 and enables an encoder 501. Normally the controller initiates a routine in the central processing unit which includes, as one step, the reading of the attention summary register 96 in FIG. 5A. During this reading operation, the RS signals have a value $04_8$, as previously indicated, and other circuitry (not shown)

transmits, in response to the receipt of the DEM-A signal, a RD ATTN SUM-A gating signal into the encoder 501. The encoder 501 also receives the DS SWITCH signals from the circuit 400 and energizes a conductor in the CD-A wires 31A corresponding to the number transmitted by the DS SWITCH circuit 400. This identifies the drive to the data processing system connected to the controller 13 as having sent an ATTN signal.

The ATA stage 500 can be reset two ways. First, a remote register writing operation identifying the attention summary register 96 and containing a ONE in a bit position corresponding to the number of the drive designated by the DS SWITCH CIRCUIT 400 can reset the ATA-A stage 500. Specifically, a WR ATTN SUM-A signal enables a multiplexer 502 to couple one of a plurality of inputs therethrough as the CLR ATTN-A signal. The selected conductor is defined by the signals from the DS SWITCH CIRCUIT 400. The resulting CLR ATTN-A signal resets the ATA-A stage 500 and is the signal which is transmitted to the inverter 436 in FIG. 12C.

Other circuitry shown in FIG. 12D transmits an ATA MAS RES pulse as described later. If the PORT A ON signal is active, the ATA MAS RES pulse energizes an AND gate 504 and clocks the ATA-A stage 500 to a reset condition. This does not produce the CLR ATTN A signal.

Analogous circuitry is associated with the device bus 25. The SET ATA-B signal directly sets a flip-flop 505. An encoder 506 and a multiplexer 507 perform the same functions in response to signals on the device bus 25 during remote register reading and writing operations as the encoder 501 and multiplexer 502 do. The multiplexer 507 also transmits the CLR ATTN-B signal which resets the flip-flop 505 and is coupled to the second control section 430B in FIG. 12C.

Now referring to FIG. 12D, when the PORT B ON signal is active, it conditions a multiplexer 508 analogous to the multiplexer 453 to couple incoming signals on the CD-B wires 34B onto CD-AB wires 34C for transmission to other portions of the drive shown in FIG. 5B. When the PORT B ON signal is not active, signals on the CD-A wires 34A are transferred through the multiplexer 508. Likewise, the multiplexer 507 also couples the various address and control signals from the control section 30B to sections 404B and 430B when the PORT B ON signal is active.

During the transmission of control information from the drive, the CD-AB signals are applied to the inputs of multiplexers 509 and 510. When the PORT B ON signal is active and the PORT A ON signal is inactive, the multiplexer 509 transmits the CD-AB signals on the wires 34C onto the CD-B conductors 34B while the multiplexer 510 can couple the output of the encoder 501 onto the CD-A conductors 34A. If the PORT B ON signal is inactive while the PORT A ON signal is active, multiplexer 509 couples the output of the encoder 506 in FIG. 12A onto the CD-B conductors 34B while the CD-AB conductors 34C are coupled through the multiplexer 510 onto the wires 34A. Thus, it is possible to retrieve the contents of either attention summary register at any time, regardless of the controlling bus.

One stage of each attention summary register is located in each drive. Although the controller receives the signal which appears on the parity wire 35A or 35B when the contents of the corresponding attention summary register are retrieved, the parity signal has no meaning so it is disregarded.

RS-AB signals selected by the multiplexer 453 are coupled to a decoder 511 which transmits one signal for each register in the drive. Two of these signals are shown as being a CONT REG signal which is transmitted when the RS signals identify the control and status register 84 (RS=00$_8$) and an ATN REG signal which is transmitted any time the RS signals identify the attention summary register 96 or 97 (RS=04$_8$).

When the decoder 511 in FIG. 12D receives RS-AB signals corresponding to control and status register 84, it provides one input to an AND gate 512. The other input comes from an AND gate 513 which is enabled during a writing operation (i.e., the CTOD HOLD-AB signal is active) when the GO bit position in the control and status register 84 does not contain a ONE (i.e., a flip-flop 516 is reset). A TIM 3-AB signal during a synchronizing operation from the multiplexer 453 energizes the AND gate 513 so the AND gate 512 stores the FUNCTION bits from the multiplexer 507 in a latch 517. As soon as the latch 517 contains the FUNCTION bits, a decoder 520 can transmit an READ IN, NG DRI CLR, or PACK ACK signal. The READ IN and PACK ACK signals are transmitted whenever the FUNCTION bits define a command used to verify a medium on a drive when the drive is adapted to accept different media. Cartridge disk drives or magnetic tape drives are examples.

The decoder 461 also receives the output from the latch 517 but is not enabled to transmit signals immediately. When it does, it transmits command signals depending on the value of the FUNCTION bits. Any time a command defines a data transfer, an OR gate 521 transmits an ANT DATA COM signal. This signal indicates that a data command is being decoded and the actual data command from a decoder 522 is not transmitted until a further delay elapses.

An AND gate 523 enables the decoder 461 to produce an appropriate command signal if a transfer command is involved. Thus, the OR gate 521 transmits the ANT DATA COM signal which is applied to an AND gate 524 shown in FIG. 12A as a portion of a parity and control circuit 515A immediately up the assertion of the GO signal from the flip-flop 516.

Whenever the control and status register 84 receives a data transfer command during a writing operation with a ONE in the GO bit position, a GO BIT signal normally conditions a flip-flop 525 shown in FIG. 12D. When the TIM 3-AB interval terminates, the AND gate 513 is de-energized. If an ODD PARITY signal is active indicating no parity errors occurred during the writing operation, an AND gate 526 is energized before the AND gates 513 shift to an inactive state. Thus, at the end of the TIM 3 interval, the flip-flop 525 is set. This circuitry prevents a GO bit from being stored if a parity error is detected.

The flip-flop 525 thereby transmits an STO GO signal. If the previously described COMP ERR signal is inactive, an inverter 528 enables an AND gate 530 and an OR gate 531 to condition the flip-flop 516. All of this operation will terminate before the DEM signal on the corresponding bus terminates. When the SEL DEM-AB signal does terminate, an inverter 532 clocks the flip-flop 516 to a set condition if the STO GO signal is active and transmits the GO signal which energizes the normally enabled AND gate 523. When the flip-flop 516 sets, it also disables the AND gate 513 to prevent any subsequent transfers into the control and status register 84 until the flip-flop 516 resets, which occurs either when the data transfer is finished or when other circuits in the drive (not shown) transmit a CLR GO signal which resets both the flip-flops 516 and 525.

The normally enabling input to the AND gate 523 appears in drives which contain removable media and is an STAT VV signal which controls the status of the VV stage in status register 85 (FIG. 9). The circuit shown in FIG. 12D transmits the STAT VV signal if both flip-flops 533 and 534 are set. The output from the flip-flop 533 is a VOL VAL A signal which energizes an OR gate 535 while the output of the flip-flop 534 is a VOL VAL B signal which energizes the OR gate 536. The OR gates 535 and 536 are inputs to an AND gate 537. Thus, when both flip-flops 533 and 534 are set, the AND gate 537 transmits the STAT VV signal and enables the AND gate 523.

In order to change the removable media, an operator must stop the drive. As a result, the MOL signal becomes inactive. Whether a medium is changed or not, the MOL signal becomes inactive and then shifts to an active state and clocks both the flip-flops 533 and 534 to a reset condition. Immediately the STAT VV signal becomes inactive and disables the AND gate 523 and decoder 461. No data transfers or other operations can occur. However, either a READ IN or PACK ACK signal energizes an OR gate 538 to enable AND gates 540 and 541. These two commands are incorporated at the beginning of subroutines. The READ IN command enables a transfer to a medium without regard to what might be on the medium. The PACK ACK command is an initial command in a subroutine which determines the identity of the media.

If the second control section 430A in FIG. 12C transmits the PORT A ON signal, the AND gate 540, in FIG. 12D directly sets the flip-flop 533 and energizes the OR gate 535. The PORT A ON signal also energizes the OR gate 536 so the AND gate 537 transmits the STAT VV signal. If a request occurs on device bus 25, however, the PORT B ON signal will energize the OR gate 535, but the flip-flop 534 remains reset. Thus, the drive will not respond to any other commands over the device bus 25 except the READ IN or PACK ACK commands.

When the AND gate 523 enables the decoder 461, it also enables a RUN signal to clock a flip-flop 542 to a set condition. This then enables the decoder 522 to transmit one of several transfer command control signals.

As previously indicated, it is possible to clock the ATA stages 500 and 505 shown in FIG. 12A in response to an ATA MAS RES pulse by energizing either the AND gate 504 when the PORT A ON signal is active or an AND gate 549 when the PORT B ON signal is active. The ATA MAS RES signal is transmitted by an OR gate 543 in FIG. 12D in response to either of two conditions. First, the clocking pulse which loads the latch 514 energizes an AND gate 544 if the COMP ERR signal is not active. The other input to the OR gate 542 is the MAS RES pulse from an OR gate 546 which also resets the flip-flop 493 in FIG. 12A. Still referring to FIG. 12D, the OR gate 546 transmits the MAS RES pulse in response to a signal from an inverter 547 if the POWER OK signal becomes inactive or by a pulse from a monostable multivibrator 550 triggered by an OR gate 551. The NG DRV CLR command signal from the decoder 520, the REL COM signal from the decoder 461, an INITAB signal from the multiplexer 453 or an REL BUS signal from the OR gate 466 in FIG. 12C triggers the multivibrator 550. The resulting pulse energizes the OR gate 546 to produce a MAS RES pulse which, in turn, produces the ATA MAS RES pulse at the output of the OR gate 543.

The MAS RES pulse also clears the flip-flop 542 through an OR gate 553. Flip-flop 542 may also be reset when any of several error conditions, symbolized by COND conductors, energize an OR gate 554 thereby to trigger a monostable multivibrator 555. Thus, the decoder 522 transmits its output signals until it is reset by the MAS RES pulse or in response to an error condition.

Now referring again to FIG. 12A, the parity and synchronous control section 515A contains the AND gate 524 as previously indicated. The AND gate 524 transmits the previously described SYN REC EN-A signal which enables the receivers for the data set 51A in the switch circuit 251 in FIG. 5A in response to the coincidence of the ANT DATA COM and PORT A ON signals. The parity and synchronous control section 515B transmits a SYNC REC EN-B signal in response to the coincidence of the PORT B ON and ANT DATA COM signals. During reading operations involving the transfer of data to the controller, circuitry in the synchronous bus control circuit 150 in FIG. 5B transmits an SYN DT EN signal which is applied to both an AND gate 561 in the circuit 515A and a corresponding AND gate in the circuit 515B. The AND gate 561 transmits the SYNC XMIT EN-A signal previously discussed.

The other portion of the circuit 515 comprises a parity circuit 562 and an OR circuit 563 which constitutes a unique code transmitter. Specifically, when the PORT A ON signal is not active, an inverter 564 energizes the OR gate 563 and applies a ONE to the parity bus wire 35A.

Assume that the PORT B ON signal is active and the controller 13 initiates a remote register reading operation. The comparator 401 transmits the MSEL-A signal and the first control section 404A produces the SEL DEM-A signal and a TRA-A signal which is coupled back to the controller 13 over the TRA-A wire 42A. However, unless the reading operation involves the attention summary register 96, no data is transmitted during the reading operation over the CD wires 34A so the system receives data with a value of zero and the parity circuit 515A transmits the parity bit of ONE onto the wire 35A. Thus, if the CPU 10 in FIG. 1 receives all ZERO'S with a parity bit of ONE through the controller 13, the CPU 10 "knows" that the drive is connected to the controller 16. When the PORT A ON signal is active, an inverter 565 provides an input to the circuit 515B.

If, while the drive is connected to the controller 16, the controller 13 initiates a reading operation from the control and status register 84, the latch 432 in FIG. 12C sets and transmits the PORT A REQ signal. This is the only reading operation which asserts the PORT A REQ signal. Any remote register writing operation also sets the latch 432 in FIG. 12C under these conditions. Thus, when the controller 16 relinquishes control, the drive effects a transfer of control to the controller 13. Other reading operations can be performed merely to ascertain whether the drive is then connected to another controller. They do not cause a change in control, however. Analogous responses are made in response to attempts by the controller 16 to effect a remote system transfer while the drive is under the control of the controller 13.

Thus, in accordance with this invention, the circuitry shown in FIGS. 5A, 5B and 12A through 12D connects a drive to two controllers. The drive itself contains all the priority and selection circuitry necessary to arbitrate conflicting requests for supervision from the controllers. As the drive can operate through either of two controllers, data transfer rates can be increased. Although in FIG. 1 the controllers 13 and 16 connect to a single central processor unit 10, different central processing units can connect to each of the controllers 13 and 16. With this arrangement, a drive constructed in accordance with this invention can be shared by different data processing systems.

This drive arrangement also simplifies programming. In some prior machines, it is necessary to read a specific register before any sequence of operations between a controller and a drive can be initiated. In accordance with this invention, the contents of any register in the drive can be retrieved. If the return data has a unique code, e.g., a value of ZERO, the sequence of the program being executed can be altered when the operation with the other controller ends. Any attempt to write information into a drive register from one controller while the other controller is controlling is aborted. Control over the drive registers conditions then immediately transfers to the other controller when the transfer operations then underway are finished. Furthermore, when any operation is completed, the drive causes interruption of the data processing system to constantly update the status of the drive.

It will be apparent that FIGS. 5A, 5B and 12A through 12D disclose specific aspects of a particular embodiment of a drive constructed in accordance with this invention. Certain circuits are related specifically to a magnetic disk drive which uses a cartridge disk. This includes, for example, circuitry shown in FIG. 12D for transmitting the STAT VV signal and for transmitting the READ IN and PCK ACK signals. Further, specific logic diagrams have been disclosed. It will be apparent that many modifications can be made to this specific logic diagram for implementing this invention, with the same or different types of sequential access storage drives. Therefore, it is the object of the appended claims to cover all such variations and modifications as come within the true spirit and scope of the claims.

What is claimed as new and desired to be secured by Letters Patents of the United States is:

1. A drive for use in a secondary storage facility for a data processing system, said drive comprising:
 A. a medium for storing data,
 B. first and second bus connection means, each of said bus connection means receiving address signals, control signals, data signals representing data to be transferred to and from said medium, and control data signals representing control data, the control data being transferred to and from said drive and being used by said drive to effect transfers of data to and from the medium,
 C. data path means for carrying data signals to and from said medium,
 D. selection means for transmitting selection signals that identify, in a first state, said first bus connection means as a selected bus connection means and said second bus connection means as a nonselected bus connections means and that identify, in a second state, said first bus connections means as the nonselected bus selection means and said second bus connection as the selected bus connection means,
 E. first switch means for selectively coupling said data path means to said selected bus connection means in response to the selection signals,
 F. first and second control sections connected, respectively, to said first and second bus connection means and to said selection means, said selection means being responsive to signals from said first and second control sections, each of said control sections including:
  i. means responsive to the control and address signals and to the selection signals for receiving the control data signals from said bus connection means connected to it,
  ii. means responsive to the address and control signals at its bus connection means, when it is the selected bus connection means, for controlling the transmission of control data signals onto said selected bus connection means for a transfer of control data from said drive, and
  iii. means responsive to the address and control signals at its bus connection means when it is the nonselected bus connection means for transmitting control data signals having a unique value to said nonselected bus connection means thereby to indicate that said drive is not conditioned to respond to the address and control signals,
 G. control means connected to said data path means for controlling transfers of data signals to and from said medium over said data path means, and
 H. second switch means connected to said control means, said first and second bus connection means and said selection means for coupling the address and control signals at the selected bus connection means to and from said control means in response to the selection signals thereby to enable the transfer of control data signals to and from said control means.

2. A drive as recited in claim 1 wherein the data signals are transferred synchronously and certain of the control signals constitute synchronous control signals, said drive including:
 A. means in said data path means responsive to a first synchronous control signal for initiating synchronously controlled data transfers to and from said medium, and
 B. means in said first switch means for receiving from and transmitting to said selected bus connection means the data signals and synchronous control signals.

3. A drive as recited in claim 2 comprising:
 A. clock means for transmitting first and second series of clocking pulses at the same frequency but at different phases, and
 B. signal processing means in said first and second control sections, respectively, for processing predetermined ones of the address and control signals received from their respective bus connection means in response to the first and second series of clocking pulses, respectively.

4. A drive as recited in claim 3 wherein the control data signals are transferred asynchronously in response to address signals and others of the control signals that constitute asynchronous control signals, a first asynchronous control signal controlling whether a transfer of control data signals is to or from said medium and a second asynchronous control signal that enables the initiation of a transfer of control data signals, each of said signal processing means including:
  i. means responsive to the receipt of the first and second asynchronous control signals from said bus connection means connected thereto for initiating a transfer cycle,
  ii. means responsive to said clock means and said asynchronous transfer initiation means for defining, during the transfer cycle, a transfer interval during which a transfer of the control data signals may occur, and
  iii. means responsive to the completion of the transfer interval for generating a third asynchronous control signal for transfer to said bus connection means connected thereto.

5. A drive as recited in claim 4 wherein:
  A. said control means includes:
    i. a plurality of registers, each said register having an address, and
    ii. means responsive to the receipt of predetermined ones of the asynchronous control signals and address signals from said second switch means for transferring control data signals to or from a said register identified by the address signals, and
  B. each of said first and second control sections including parity signal generating means, each said parity signal generating means including:
    i. first parity means enabled by the selection signals to be responsive to a transfer of the contents of a register to said bus connection means connected thereto for generating a parity signal that is transferred to said corresponding bus connection means when that said bus connection means is said selected bus connection means, and
    ii. second parity means enabled when the selection signals designate said other bus connection means as the selected bus connection means for generating, in response to the address signals and asynchronous control signals from said bus connection means connected thereto, a predetermined parity signal for transfer to said corresponding bus connection means, the parity signal from said second parity means constituting a portion of the unique value of the control data signals.

6. A drive as recited in claim 5 wherein
  A. said drive additionally includes:
    i. means for monitoring predetermined operating conditions in said drive, and
    ii. means connected to said monitoring means for generating a condition signal when said monitoring means sense the existence of any one of the operating conditions,
  B. each of said first and second control section additionally includes:
    i. a bistable stage for generating an interrupting signal,
    ii. means for setting said bistable stage in response to the condition signal thereby to generate the interrupting signal,
    iii. means coupled to said bistable stage for coupling the interrupting signal to said corresponding bus connection means as another one of the asynchronous control signals, and
    iv. encoding means coupled to said bistable stage for generating a signal for transfer to said bus connection means as one of the control data signals in response to predetermined address signals when said bistable stage is set, and
  C. said second switch means includes first and second multiplexers, said first and second multiplexers being responsive to selection signals that designate said first bus connection means as the selected bus connection means for respectively coupling the contents of any of said registers or signals from said encoding means in said first control section to said first bus connection means and signals from said encoding means in said second control section to said second bus connection means and responsive to selection signals that designate the second bus connection means as said selected bus connection means for coupling signals from said encoding means in said first control section to said first bus connection means and the contents of any of said registers or signals from said encoding means in said second control section to said second bus connection means.

7. A drive as recited in claim 5 wherein one of said plurality of registers in said control means is a designated register, said drive additionally including:
  A. address decoder means in each of said first and second control sections for transmitting a designated register selection signal in response to a predetermined set of the address signals from the respective one of the bus means that identify said designated register,
  B. means in each of said first and second control sections responsive to the first asynchronous control signal for transmitting a reading signal when the first asynchronous control signal indicates that the subsequent transfer is to be from said medium,
  C. first and second memory means in said selection means corresponding to said first and second control sections, respectively, each of said first and second memory means, when enabled, transmitting a request signal for the corresponding bus means,
  D. means in said selection means for transmitting first and second selection signals to designate one of said first and second control sections as the selected control section and third and fourth selection signals which designate that the first and second control sections, respectively, are in a nonselected state, and
  E. first and second enabling means in said selection means connected to enable said first and second memory means to transmit the request signals in response to the third and fourth selection signals, respectively, and in response to the reading signal and selected register selection signal to thereby enable said selection means to transmit the first or second selection signals.

8. A drive as recited in claim 4 including:
  A. a plurality of registers in said control means, each of said registers having an address,
  B. a bistable stage in each of said first and second control sections,
  C. means in said control means responsive to the receipt of predetermined ones of the asynchronous control signals and address signals from said second switch means for transferring control data signals to a register designated by the address signals, D. means in each of said first and second control sections responsive to the first asynchronous control signal for transmitting a writing signal when the subsequent transfer is to said drive, E. first and second memory means corresponding to said first and second control sections, each memory means being located in said selection means and transmitting a request signal for the corresponding bus means, F. first and second enabling means in said selection means connected to enable said first and second memory means, respectively, in response to the writing signal and address signals identifying one of said plurality of registers only from the corresponding bus connection means, the corresponding one of the said memory means transmitting its request signal and said selection means transmitting its corresponding selection signals when said corresponding memory means is enabled.

9. A drive as recited in claim 8 wherein predetermined combinations of address and control data signals at one of said bus connection means resets said corresponding bistable stage, said drive additionally comprising third and fourth enabling means in said selection means connected to enable said first and second memory means, respectively, to transmit a request signal, each of said third and fourth enabling means being responsive to the predetermined combination of address and control data signals and to the asynchronous control signals thereby to cause said selection means to transmit the corresponding selection signals.

10. A drive as recited in claim 1 wherein
A. said drive additionally comprises
   i. means for transmitting a first condition signal representing a first operating condition in said drive, and
   ii. means for transmitting a second condition signal representing a second condition in said drive,
B. said selection means additionally includes
   i. first and second memory means corresponding to said first and second bus connection means, each of said memory means transmitting a request signal,
   ii. means responsive to the selection signals and the request signals for transmitting first, second, third and fourth selection signals, and
   iii. first and second release means corresponding to said first and second bus connection means, each of said release means transmitting a release signal, and
C. each of said control sections additionally includes
   i. a bistable stage,
   ii. first setting signal means responsive to a corresponding request signal and release signal for transmitting a first setting signal,
   iii. second setting signal means responsive to the first condition signal and a corresponding one of the first and second selection signals for transmitting a second setting signal,
   iv. third setting signal means responsive to the second condition signal for transmitting a third setting signal, and
   v. means responsive to any one of the corresponding first, second and third setting signals for setting said bistable stage thereby to transmit to said corresponding bus connection means an interrupting signal that interrupts the data processing system.

11. A drive as recited in claim 10 wherein the first and second selection signals are used to designate the selected bus connection means, said drive additionally comprising:
A. master resetting means in said control means for transmitting a master resetting signal, and
B. in each of said first and second control sections,
   i. means responsive to the master resetting signal and the corresponding one of the first and second selection signals for resetting said bistable stage, and
   ii. means responsive to a transfer of control data signals to said bistable stage for resetting said bistable stage.

12. A drive as recited in claim 11 wherein said master resetting signal transmitting means includes:
   i. first means for generating a first reset enabling signal in response to an enabling of said data path means to operate during a data transfer,
   ii. second means for generating a second reset enabling signal in response to the transfer of control data signals having other than the unique value to said control means, and
   iii. gating means for generating the master resetting signal in response to either of the reset enabling signals.

13. A drive as recited in claim 1 wherein each of said bus connection means includes a conductor for a first control signal which initiates a transfer of control data with a location defined by the address signals, a conductor for a second control signal that indicates whether the transfer of control data signals is to or from the addressed location, said selection means comprising:
   i. first and second bistable stages for transmitting, in a first state, first and second selection signals, respectively,
   ii. first and second means for transmitting third and fourth selection signals, respectively,
   iii. first and second means responsive to the first control signal from said corresponding bus connection means for transmitting a first enabling signal, and
   iv. first and second latch means responsive to the second control signal, the address signals and the control data signals from said corresponding bus connection means for transmitting a second enabling signal, and
   v. first and second gating means responsive, respectively, to a corresponding one of third and fourth selection signals and to the concurrence of the first and second enabling signals from said respective transmitting means for causing said bistable stage to assume the first state, said gating means causing said bistable stage to assume its second state when both the enabling signals are absent.

14. A drive as recited in claim 13 wherein said drive additionally includes means for shifting a ready signal to a first state when said drive is conditioned to operate, said selection means additionally comprising:
   i. switch means having at least three positions for transmitting first and second setting signals in first and second positions, respectively,
   ii. first and second reset signal transmitting means responsive to said switch means and to a shift of the ready signal to the first state for coupling the first and second resetting signals, respectively, to said first and second bistable stages in said selection means for causing a corresponding one of said bistable stages to assume a second state in response thereto, said corresponding reset signal transmitting means being active only when said switch means are in said first or second positions.

15. A drive as recited in claim 1 wherein the address and certain of the control signals at the first and second bus connection means initiate a control data signal transfer cycle and wherein
   A. said unique code transmitting means in each of said control sections comprises
      i. a parity signal generator for generating a parity signal based upon the control data signals, the parity signal constituting an additional control data signal,
      ii. means for enabling said parity signal generator to generate a parity signal in response to the other control data signals when said corresponding control section is connected to said selected bus connection means, and
      ii. means for causing said parity signal generator to produce a predetermined parity signal for transfer to said corresponding bus connection means when it is not designated to be said selected bus connection means, and
   B. each of said control sections includes means for transmitting a control signal to indicate the completion of a control data signal transfer cycle in response to the receipt of the address signals and other control signals, said second switch means coupling control data signals with a value of zero and a valid parity signal for a zero value from said parity generator as a unique value in response to an attempt to transfer to or from said bus connection means when the selection signals identify said other bus connection means as said selected bus connection means.

16. A drive as recited in claim 1 wherein said data storage medium is removable from said drive and said drive has means for transmitting a ready signal that shifts to a ready state when said medium is properly installed and conditioned to operate and wherein predetermined values of the control data signals constitute command signals, said drive additionally comprising:
   A. a command register for receiving the command signals in response to predetermined address and control signals,
   B. decoder means having an enabled and disabled state, said decoder, in the enabled state, providing output command signals, and
   C. means for enabling said decoder means including:
      i. means for transmitting an initiating signal in response to signals from said command register,
      ii. first and second bistable status stages,
      iii. enabling means responsive to the selection signals and the condition of said status stages for transmitting an enabling signal, each of said first and second status stages being responsive to a shift of the ready signal to its ready state for terminating the enabling signal,
      iv. means responsive to predetermined sets of command signals in said command register and the selection signals for causing a corresponding one of said status stages, in connection with the selection signals, to energize said enabling means to transmit the enabling signal, and
      v. means responsive to the enabling signal and the initiating signal for enabling said decoder means.

* * * * *

UNITED STATES PATENT AND TRADEMARK OFFICE
CERTIFICATE OF CORRECTION

PATENT NO. : 4,007,448
DATED : February 8, 1977
INVENTOR(S) : Winston Sergeant, John V. Levy, Demetrios Lignos and Kent M. Griggs It is certified that error appears in the above-identified patent and that said Letters Patent are hereby corrected as shown below:

Col. 1, line 20, after "or" insert --is--
Col. 2, line 49, after "status" insert --register--
Col. 2, line 54 - delete "retrieves" insert --tries to retrieve--
Col. 5, line 18, delete "an" insert --and--
Col. 9, line 57, delete "1;3" and insert --103--
Col. 12, line 20, delete "interlace" and insert --interface--
Col. 16, line 39, delete "of" insert --or--
Col. 21, line 29, delete "same" and insert --some--
Col. 22, line 23, delete the comma after "register"
Col. 23, line 44, after "52A" insert --and 53A--
Col. 25, line 50, delete "the" and insert --they--
Col. 25, line 53, delete "and the signal 85, the GO"
         line 54, delete "bit position in the control register 84"
Col. 28, line 51, delete "becoms" insert --becomes--
Col. 29, line 47, delete "sequnce" and insert --sequence--
Col. 30, line 21, insert a closed parenthesis --)-- after "13J"
Col. 30, line 36, delete "40 4B" and insert --404B--
Col. 32, line 37, insert --a-- after "has"
Col. 32, line 60, delete "oerations" and insert --operations--

Signed and Sealed this

Seventh Day of February 1978

[SEAL]

Attest:

RUTH C. MASON
Attesting Officer

LUTRELLE F. PARKER
Acting Commissioner of Patents and Trademarks